United States Patent
Deir et al.

(10) Patent No.: US 10,527,146 B2
(45) Date of Patent: Jan. 7, 2020

(54) STRUCTURE AND METHOD OF ASSEMBLING A DIFFERENTIAL ASSEMBLY

(71) Applicant: ABB Schweiz AG, Zurich (CH)

(72) Inventors: Peter Joe Deir, Fraser, MI (US); Robert Raymond Scott, III, Lake Orion, MI (US); Arnold Bell, Brighton, MI (US); Michael Martin Manuszak, Saint Clair, MI (US)

(73) Assignee: ABB Schweiz AG, Zurch (CH)

( * ) Notice: Subject to any disclaimer, the term of this patent is extended or adjusted under 35 U.S.C. 154(b) by 241 days.

(21) Appl. No.: 15/487,455

(22) Filed: Apr. 14, 2017

(65) Prior Publication Data
US 2018/0299003 A1    Oct. 18, 2018

(51) Int. Cl.
*F16H 48/08* (2006.01)
*F16H 48/00* (2012.01)

(52) U.S. Cl.
CPC ......... *F16H 48/08* (2013.01); *F16H 2048/02* (2013.01); *F16H 2048/082* (2013.01)

(58) Field of Classification Search
CPC ..... F16H 48/08; F16H 57/037; F16H 57/0056
See application file for complete search history.

(56) References Cited

U.S. PATENT DOCUMENTS 6,745,471 B2 *   6/2004   Bendtsen ............... F16C 25/06
                                                               29/469

FOREIGN PATENT DOCUMENTS

| EP | 604763 B  | 5/1997 |
| JP | 63200935 A | 8/1988 |
| JP | 3270830 A | 12/1991 |

OTHER PUBLICATIONS

Search Report and Written Opinoin, PCT Appln. No. PCT/US18/027237, dated Jun. 27, 2018, 23 pgs.

* cited by examiner

*Primary Examiner* — Derek D Knight
(74) *Attorney, Agent, or Firm* — Taft, Stettinius & Hollister LLP; J Bruce Schelkopf

(57) ABSTRACT

A nesting structure supports a differential case. The nesting structure includes a first support structure that supports the differential case. The nesting structure includes a second support structure spaced apart from the first support structure to define a support opening. The support opening receives a first shim and establishes a first orientation between the first shim and the differential case in which the first shim is non-parallel with respect to a first bearing surface of the differential case.

26 Claims, 17 Drawing Sheets

1500

CONCURRENTLY INSERT FIRST SHIM, SECOND SHIM, AND DIFFERENTIAL CASE INTO DIFFERENTIAL OPENING DEFINED BY DIFFERENTIAL CARRIER SUCH THAT, UPON FIRST SHIM, SECOND SHIM, AND DIFFERENTIAL CASE BEING FULLY SEATED WITHIN DIFFERENTIAL CARRIER, FIRST SHIM CONTACTS DIFFERENTIAL CARRIER AND IS PARALLEL WITH RESPECT TO FIRST BEARING SURFACE OF DIFFERENTIAL CASE, AND SECOND SHIM CONTACTS DIFFERENTIAL CARRIER AND IS PARALLEL WITH RESPECT TO SECOND BEARING SURFACE OF DIFFERENTIAL CASE

STRUCTURE AND METHOD OF ASSEMBLING A DIFFERENTIAL ASSEMBLY

BACKGROUND

A differential case may be inserted into a differential carrier.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

According to an aspect, a nesting structure is configured to support a differential case. The nesting structure comprises a first support structure configured to support the differential case. A second support structure is spaced apart from the first support structure to define a support opening configured to receive a first shim and establish a first orientation between the first shim and the differential case in which the first shim is non-parallel with respect to a first bearing surface of the differential case.

According to an aspect, a method of assembling a differential assembly is provided. The method comprises establishing a first orientation between a first shim and a differential case in which the first shim is non-parallel with respect to a first bearing surface of the differential case. The method comprises inserting the first shim and the differential case into a differential opening defined by a differential carrier such that the first shim contacts the differential carrier and moves from the first orientation to a second orientation in which the first shim is parallel with respect to the first bearing surface.

According to an aspect, a method of assembling a differential assembly is provided. The method comprises establishing a first orientation between a first shim and a differential case in which a first shim axis of the first shim is non-parallel with respect to a differential case axis of the differential case. The method comprises inserting the first shim and the differential case into a differential opening defined by a differential carrier such that the first shim contacts the differential carrier and moves from the first orientation to a second orientation in which the first shim axis of the first shim is parallel with respect to the differential case axis of the differential case.

According to an aspect, a robot is configured to move a differential case between a nesting structure and a differential carrier. The robot comprises a support structure and a first inner gripping arm and a second inner gripping arm attached to the support structure. The first inner gripping arm and the second inner gripping arm are movable relative to the support structure between an opened position, in which the first inner gripping arm and the second inner gripping arm are configured to removably receive a first bearing structure of the differential case, and a closed position, in which the first inner gripping arm and the second inner gripping arm are configured to contact and grip the first bearing structure of the differential case. The robot comprises a first outer gripping arm attached to the first inner gripping arm, and a second outer gripping arm attached to the second inner gripping arm. The first outer gripping arm is movable relative to the first inner gripping arm and the second inner gripping arm is movable relative to the second inner gripping arm between an opened position, in which the first outer gripping arm and the second outer gripping arm are configured to removably receive a first shim, and a closed position, in which the first outer gripping arm and the second outer gripping arm are configured to contact and grip the first shim.

According to an aspect, a method of assembling a differential assembly comprises concurrently inserting a first shim, a second shim, and a differential case into a differential opening defined by a differential carrier such that, upon the first shim, the second shim, and the differential case being fully seated within the differential carrier, the first shim contacts the differential carrier and is parallel with respect to a first bearing surface of the differential case, and the second shim contacts the differential carrier and is parallel with respect to a second bearing surface of the differential case.

According to an aspect, a method of assembling a differential assembly comprises inserting a first shim and a differential case into a differential opening defined by a differential carrier such that the first shim and the differential case are in a first position not fully seated within the differential carrier. The method comprises applying an insertion force to at least one of the first shim or the differential case to transition the first shim and the differential case from the first position to a second position fully seated within the differential carrier. The method comprises measuring the insertion force applied to at least one of the first shim or the differential case. The method comprises determining, from the insertion force, an axial force applied to the differential case by the differential carrier.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

FIGURES

The application is illustrated by way of example and not limitation in the figures of the accompanying drawings, in which like references generally indicate similar elements and in which:

FIG. 15 illustrates an example method of assembling a differential assembly;

DESCRIPTION

Figure 1:
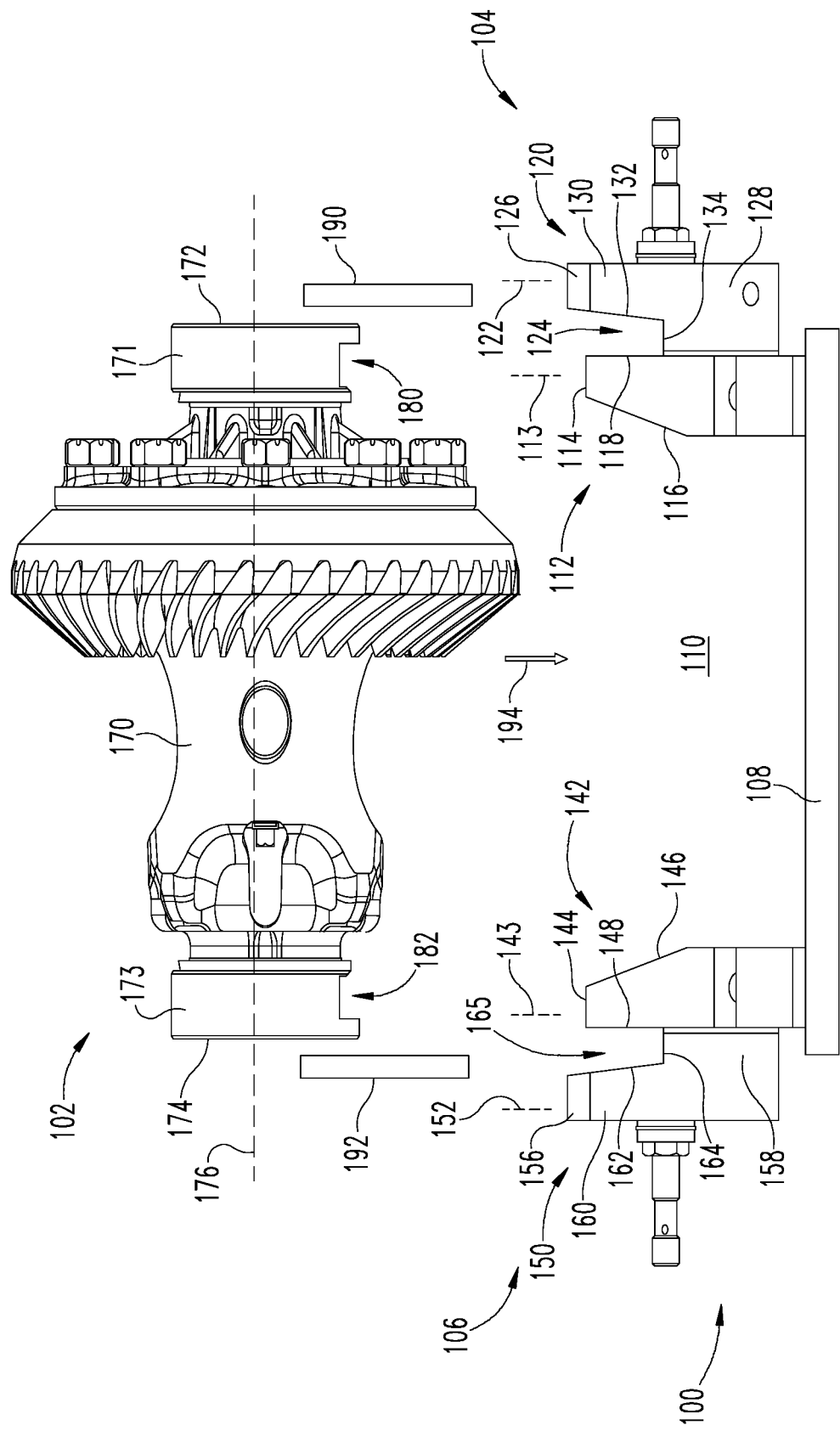
FIG. 1 illustrates an example nesting structure for supporting a differential case and shims.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Referring to FIG. 1, a nesting structure 100 for supporting a component is illustrated. In an example, the component may comprise a differential case 102. The differential case 102 may comprise a differential having a gear train with one or more shafts that allow for different rotational speeds.

The nesting structure 100 may comprise a first support 104 and a second support 106 for supporting the differential case 102. In an example, the first support 104 and the second support 106 may be attached to one another (e.g., indirectly in the illustrated example), such as with a base 108. The first support 104 and the second support 106 may be spaced apart from one another to define a case opening 110. The first support 104 and the second support 106 may be attached to the base 108, with the case opening 110 defined along one side by the first support 104, a second side by the second support 106, and along a third side by the base 108. In an example, the differential case 102 may be selectively inserted into and removed from the case opening 110 opposite the base 108.

The first support 104 comprises a first support structure 112 that extends along a first support structure axis 113 from the base 108. In an example, the first support structure 112 may support a portion of the differential case 102. The first support structure 112 may be attached to the base 108 at one end, and may support the differential case 102 at an opposing end.

The first support structure 112 comprises a support wall 114 that has a first surface 116 and a second surface 118. The first surface 116 may face inwardly towards the case opening 110 while the second surface 118 may face in an opposite direction, outwardly away from the case opening 110. In an example, the first surface 116 may extend non-parallel with respect to the first support structure axis 113, such as by defining an angle with respect to the first support structure axis 113. In an example, the angle defined between the first surface 116 and the first support structure axis 113 may be between about 10 degrees to about 80 degrees. Though not limited to being non-parallel with respect to the first support structure axis 113, the first surface 116 may be angled so as to accommodate for a size and shape of the differential case 102. In an example, the second surface 118 may extend substantially parallel to the first support structure axis 113. The differential case 102 may be supported on a surface of the first support structure 112 that extends between the first surface 116 and the second surface 118 opposite the base 108.

The first support 104 comprises a second support structure 120 that extends along a second support structure axis 122. In an example, the second support structure axis 122 may be substantially parallel to the first support structure axis 113. The second support structure 120 may be attached to and spaced apart from the first support structure 112 to define a support opening 124.

The second support structure 120 comprises a second support wall 126 that is attached to the support wall 114 of the first support structure 112. In an example, the second support structure 120 may not be directly attached to the base 108. Rather, the second support structure 120 may be attached to the first support structure 112, which is attached to the base. In an example, the second support wall 126 comprises a first wall portion 128 and a second wall portion 130. The first wall portion 128 may be attached to the second surface 118 of the support wall 114. In an example, the first wall portion 128 may be attached to the support wall 114 at an intermediate location of the support wall 114 between a first end of the support wall 114 (e.g., that is attached to the base 108) and a second end of the support wall 114 (e.g., that supports the differential case 102).

The second wall portion 130 may be attached to (e.g., separately connected together, formed with, etc.) to the first wall portion 128. In an example, the second wall portion 130 may be spaced apart from the second surface 118 of the support wall 114 to define the support opening 124. In an example, the second wall portion 130 comprises a third surface 132 that faces inwardly towards the case opening 110. In an example, the third surface 132 may extend non-parallel to the first support structure axis 113 and the second support structure axis 122. Rather, in an example, the third surface 132 may define an angle with respect to the second support structure axis 122 that is between about 10 degrees to about 80 degrees. In an example, the third surface 132 extends non-parallel with respect to the second surface 118.

The third surface 132 of the second wall portion 130 may interface with a fourth surface 134 of the first wall portion 128. In an example, the fourth surface 134 may extend non-perpendicular with respect to the first support structure axis 113 and the second support structure axis 122. For example, the fourth surface 134 may define an angle with respect to the second support structure axis 122 that is between about 10 degrees to about 80 degrees. In an example, the fourth surface 134 may be substantially perpendicular with respect to the third surface 132.

The second support 106 comprises a third support structure 142 that extends along a third support structure axis 143 from the base 108. In an example, the third support structure 142 may support a portion of the differential case 102. The third support structure 142 may be attached to the base 108 at one end, and may support the differential case 102 at an opposing end.

The third support structure 142 comprises a third support wall 144 that has a fifth surface 146 and a sixth surface 148. The fifth surface 146 may face inwardly towards the case opening 110 while the sixth surface 148 may face in an opposite direction, outwardly away from the case opening 110. In an example, the fifth surface 146 may extend non-parallel with respect to the third support structure axis 143, such as by defining an angle with respect to the third support structure axis 143. In an example, the angle defined between the fifth surface 146 and the third support structure axis 143 may be between about 10 degrees to about 80 degrees. Though not limited to being non-parallel with respect to the third support structure axis 143, the fifth surface 146 may be angled so as to accommodate for a size and shape of the differential case 102. In an example, the sixth surface 148 may extend substantially parallel to the third support structure axis 143. The differential case 102 may be supported on a surface of the third support structure 142 that extends between the fifth surface 146 and the sixth surface 148.

The second support 106 comprises a fourth support structure 150 that extends along a fourth support structure axis 152. In an example, the fourth support structure axis 152 may be substantially parallel to the third support structure axis 143. The fourth support structure 150 may be attached to and spaced apart from the third support structure 142 to define a second support opening 165.

The fourth support structure 150 comprises a fourth support wall 156 that is attached to the third support wall 144 of the third support structure 142. In an example, the fourth support structure 150 may not be directly attached to the base 108. Rather, the fourth support structure 150 may be attached to the third support structure 142, which is attached to the base 108. In an example, the fourth support wall 156 comprises a third wall portion 158 and a fourth wall portion 160. The third wall portion 158 may be attached to the sixth surface 148 of the third support wall 144. In an example, the third wall portion 158 may be attached to the third support wall 144 at an intermediate location of the third support wall 144 between a first end of the third support wall 144 (e.g., that is attached to the base 108) and a second end of the third support wall 144 (e.g., that supports the differential case 102).

The fourth wall portion 160 may be attached to (e.g., separately connected together, formed with, etc.) to the third wall portion 158. In an example, the fourth wall portion 160 may be spaced apart from the sixth surface 148 of the third support wall 144 to define the second support opening 165. In an example, the fourth wall portion 160 comprises a seventh surface 162 that faces inwardly towards the case opening 110. In an example, the seventh surface 162 may extend non-parallel to the third support structure axis 143 and the fourth support structure axis 152. Rather, in an example, the seventh surface 162 may define an angle with respect to the fourth support structure axis 152 that is between about 10 degrees to about 80 degrees. In an example, the seventh surface 162 extends non-parallel with respect to the sixth surface 148.

The seventh surface 162 of the fourth wall portion 160 may interface with an eighth surface 164 of the third wall portion 158. In an example, the eighth surface 164 may extend non-perpendicular with respect to the third support structure axis 143 and the fourth support structure axis 152. For example, the eighth surface 164 may define an angle with respect to the fourth support structure axis 152 that is between about 10 degrees to about 80 degrees. In an example, the eighth surface 164 may be substantially perpendicular with respect to the seventh surface 162.

In an example, the first support 104 and the second support 106 may be mirror images with respect to each other. For example, the first support 104 and the second support 106 may be symmetric with respect to each other about an axis that intersects a midpoint of the base 108.

Referring to the differential case 102, the differential case 102 comprises a differential 170. The differential 170 may function to aim engine power at wheels of a vehicle, and act as a final gear reduction in the vehicle. In addition, the differential 170 may transmit power to the wheels of the vehicle while allowing them to rotate at different speeds.

In an example, the differential 170 comprises a first bearing structure 171 having a first bearing surface 172 and a second bearing structure 173 having a second bearing surface 174. The first bearing surface 172 and the second bearing surface 174 may be disposed at opposing ends of the differential 170. In an example, a differential case axis 176 may extend through the first bearing surface 172 and the second bearing surface 174, such that the first bearing surface 172 and the second bearing surface 174 may extend coaxially about the differential case axis 176.

The first bearing surface 172 may define a first circumferential opening 180 that extends at least partially circumferentially around the first bearing surface 172. In an example, the first circumferential opening 180 may be defined between opposing walls of the differential 170. In an example, the second bearing surface 174 may define a second circumferential opening 182 that extends at least partially circumferentially around the second bearing surface 174. In an example, the second circumferential opening 182 may be defined between opposing walls of the differential 170.

A first shim 190 and a second shim 192 may be positioned adjacent to the differential case 102. In an example, the first shim 190 may be positioned adjacent to the first bearing surface 172 while the second shim 192 may be positioned adjacent to the second bearing surface 174. In an example, the first shim 190 and the second shim 192 may define substantially circular structures that match a size and/or a shape of the first bearing surface 172 and the second bearing surface 174.

The differential case 102, the first shim 190, and the second shim 192 may be moved in a first direction 194 towards the nesting structure 100. As will be explained herein, by moving in the first direction 194, the differential case 102, the first shim 190, and the second shim 192 may be supported by the nesting structure 100.

Figure 2:
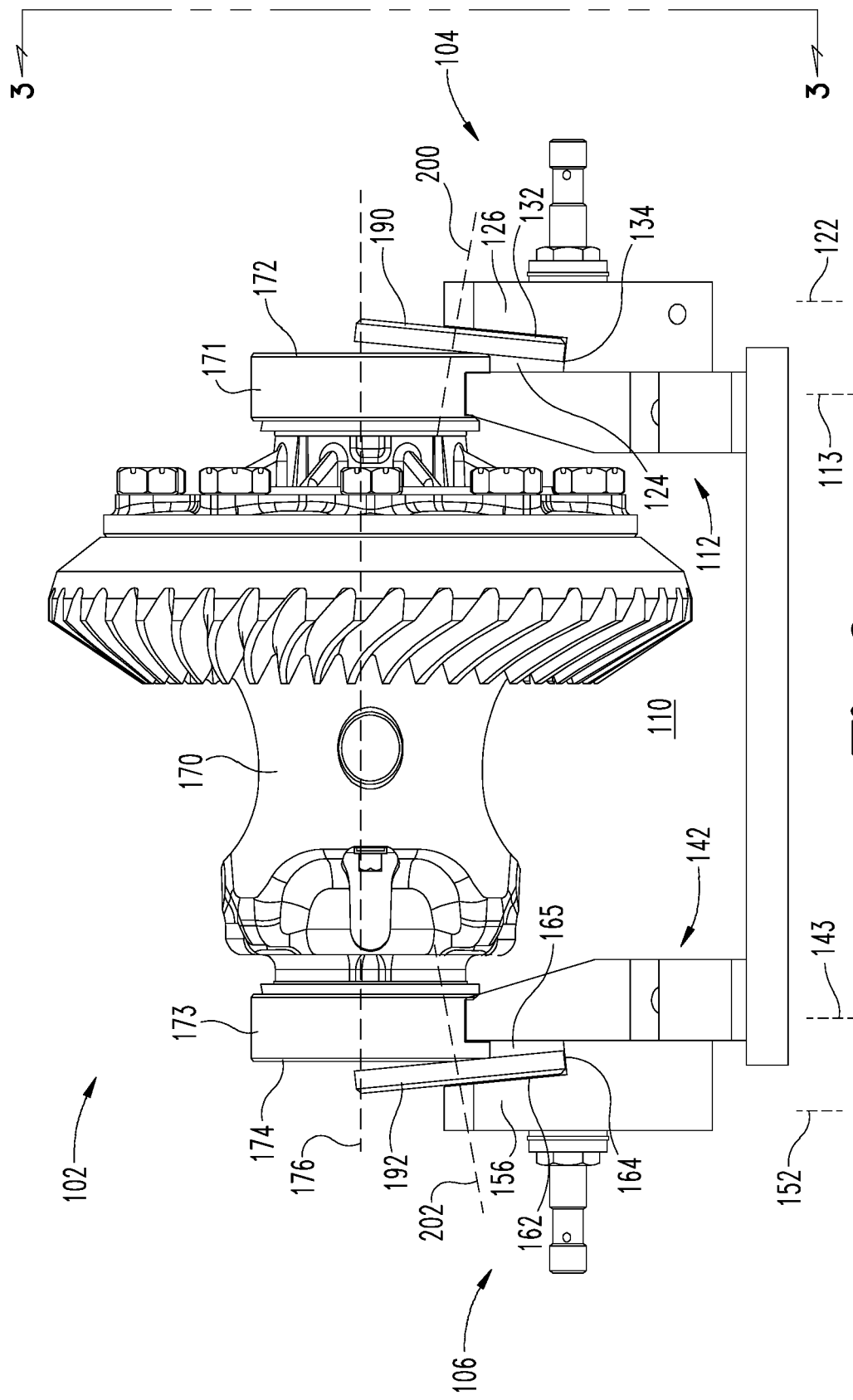
FIG. 2 illustrates an example nesting structure for supporting a differential case and shims.

Referring to FIG. 2, the nesting structure 100 may support the differential case 102, the first shim 190, and the second shim 192. In an example, at least one of the first shim 190 or the second shim 192 may be supported in a first orientation with respect to the differential case 102.

In the first orientation, the first shim 190 may be received within the support opening 124. In this way, the support opening 124 may receive the first shim 190 and establish a first orientation between the first shim 190 and the differential case 102. In an example, the first shim 190 is non-parallel with respect to the first bearing surface 172 of the differential case 102. When the first shim 190 is received within the support opening 124, the second support wall 126 of the second support structure 120 may support the first shim 190. In an example, in the first orientation, a first shim axis 200 of the first shim 190 may be non-parallel with respect to the differential case axis 176 of the differential case 102. The first shim axis 200 may extend substantially perpendicularly with respect to a plane along which the first shim 190 extends.

In an example, a side of the first shim 190 may be adjacent to and/or in contact with the third surface 132 of the second support wall 126. An outer radial side of the first shim 190 may be adjacent to and/or in contact with the fourth surface 134 of the second support wall 126. As such, due to the angles defined by the third surface 132 and the fourth surface 134, the first shim 190 may be supported in the first orientation in which the first shim 190 is non-parallel with respect to the first bearing surface 172. In an example, the first bearing surface 172 may extend substantially parallel to the first support structure axis 113 and the second support structure axis 122.

In the first orientation, the second shim 192 may be received within the second support opening 165. In this way, the second support opening 165 may receive the second shim 192 and establish a first orientation between the second shim 192 and the differential case 102. In an example, the second shim 192 is non-parallel with respect to the second bearing surface 174 of the differential case 102. When the second shim 192 is received within the second support opening 165, the fourth support wall 156 of the fourth support structure 150 may support the second shim 192. In an example, in the first orientation, a second shim axis 202 of the second shim 192 may be non-parallel with respect to the differential case axis 176 of the differential case 102. The second shim axis 202 may extend substantially perpendicularly with respect to a plane along which the second shim 192 extends.

In an example, a side of the second shim 192 may be adjacent to and/or in contact with the seventh surface 162 of the fourth support wall 156. An outer radial side of the second shim 192 may be adjacent to and/or in contact with the eighth surface 164 of the fourth support wall 156. As such, due to the angles defined by the seventh surface 162 and the eighth surface 164, the second shim 192 may be supported in the first orientation in which the second shim 192 is non-parallel with respect to the second bearing surface 174. In an example, the second bearing surface 174 may extend substantially parallel to the third support structure axis 143 and the fourth support structure axis 152.

The differential case 102 may be supported by the first support 104 and the second support 106 of the nesting structure 100. For example, the first support structure 112 may be received within the first circumferential opening 180 of the differential case 102. The third support structure 142 may be received within the second circumferential opening 182 of the differential case 102. In this way, the differential case 102 may rest upon the first support structure 112 and the third support structure 142, with the differential case 102 extending into the case opening 110. When the differential case 102 is supported by the nesting structure 100, the differential case axis 176 may extend substantially perpendicular with respect to the first support structure axis 113, the second support structure axis 122, the third support structure axis 143, and/or the fourth support structure axis 152.

In an example, the first shim 190 is non-parallel with respect to the second shim 192 when the first shim 190 and the second shim 192 are in the first orientation. For example, in the first orientation, the first shim axis 200 is non-parallel with respect to the second shim axis 202. In the first orientation, a bottom of the first shim 190 and the second shim 192 may be in closer contact than a top of the first shim 190 and the second shim 192. In this way, the first shim 190 and the second shim 192 can define a funnel shape. In this way, the nesting structure 100 may establish the first orientation between the first shim 190 and the differential case 102, in which the first shim 190 is non-parallel with respect to the first bearing surface 172. Likewise, the nesting structure 100 may establish the first orientation between the second shim 192 and the differential case 102, in which the second shim 192 is non-parallel with respect to the second bearing surface 174.

Figure 3:
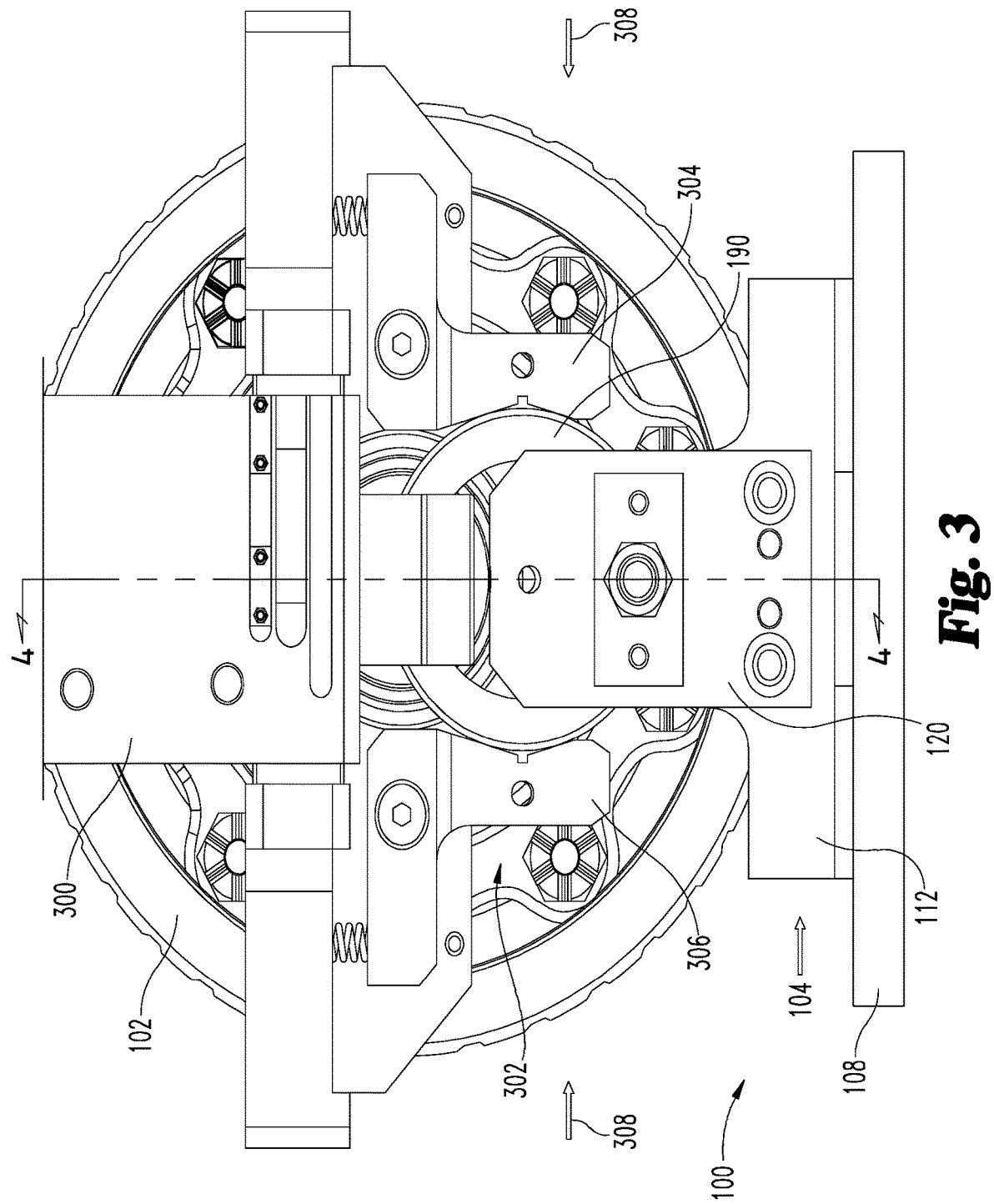
FIG. 3 illustrates an example differential case and shims being lifted by a robot.

Referring to FIG. 3, an end view of the nesting structure 100 supporting the differential case 102, the first shim 190, and the second shim 192 is illustrated as viewed from the perspective indicated by 3-3 of FIG. 2. In an example, a robot 300 may be used to remove the differential case 102, the first shim 190, and the second shim 192 (obstructed from view in FIG. 3, but illustrated in FIGS. 2 and 4) from the nesting structure 100. The differential case 102, the first shim 190, and the second shim 192 may be simultaneously removed from the nesting structure 100 by the robot 300. It is to be appreciated that while "robot" is referenced throughout the instant application, the application, including the scope of the claims, is not meant to be unduly limited thereby. For example, any one or more structure(s), mechanism(s), etc. capable of performing any one or more of the lifting, gripping, inserting, etc. action(s), operation(s), etc. mentioned in the application are contemplated. This includes where manual/human intervention is implemented (e.g., to place a shim at an angled or non-parallel orientation relative to a bearing surface of a differential case when inserting the differential case and the bearing into an opening defined by a differential carrier). For example, a pulley and/or lever system(s) may be used to lift the differential case and allow a human to maneuver the differential case over and into the opening defined by the differential carrier where the human may insert the shim at the angled or non-parallel orientation relative to the bearing surface during insertion of the differential case into the differential carrier.

In an example, the robot 300 comprises a gripping structure 302 for removing the first shim 190. The griping structure 302 comprises a first gripping arm 304 and a second gripping arm 306. The first gripping arm 304 and the second gripping arm 306 may define rounded surfaces that substantially match an outer surface of the first shim 190. The first gripping arm 304 and the second gripping arm 306 define a space there between within which the first shim 190 is received. In an example, the first gripping arm 304 and the second gripping arm 306 may be moved along a first gripping direction 308 (e.g., towards each other) so as to grip the first shim 190. It will be appreciated that while the first shim 190 is illustrated in FIG. 3, the second shim 192 may be gripped in a similar manner with an additional gripping structure (e.g., a third gripping structure illustrated in FIG. 4) having a third gripping arm and a fourth gripping arm. The third gripping structure, the third gripping arm, and the fourth gripping arm may be substantially similar to the gripping structure 302, the first gripping arm 304, and the second gripping arm 306 of FIG. 3.

Figure 4:
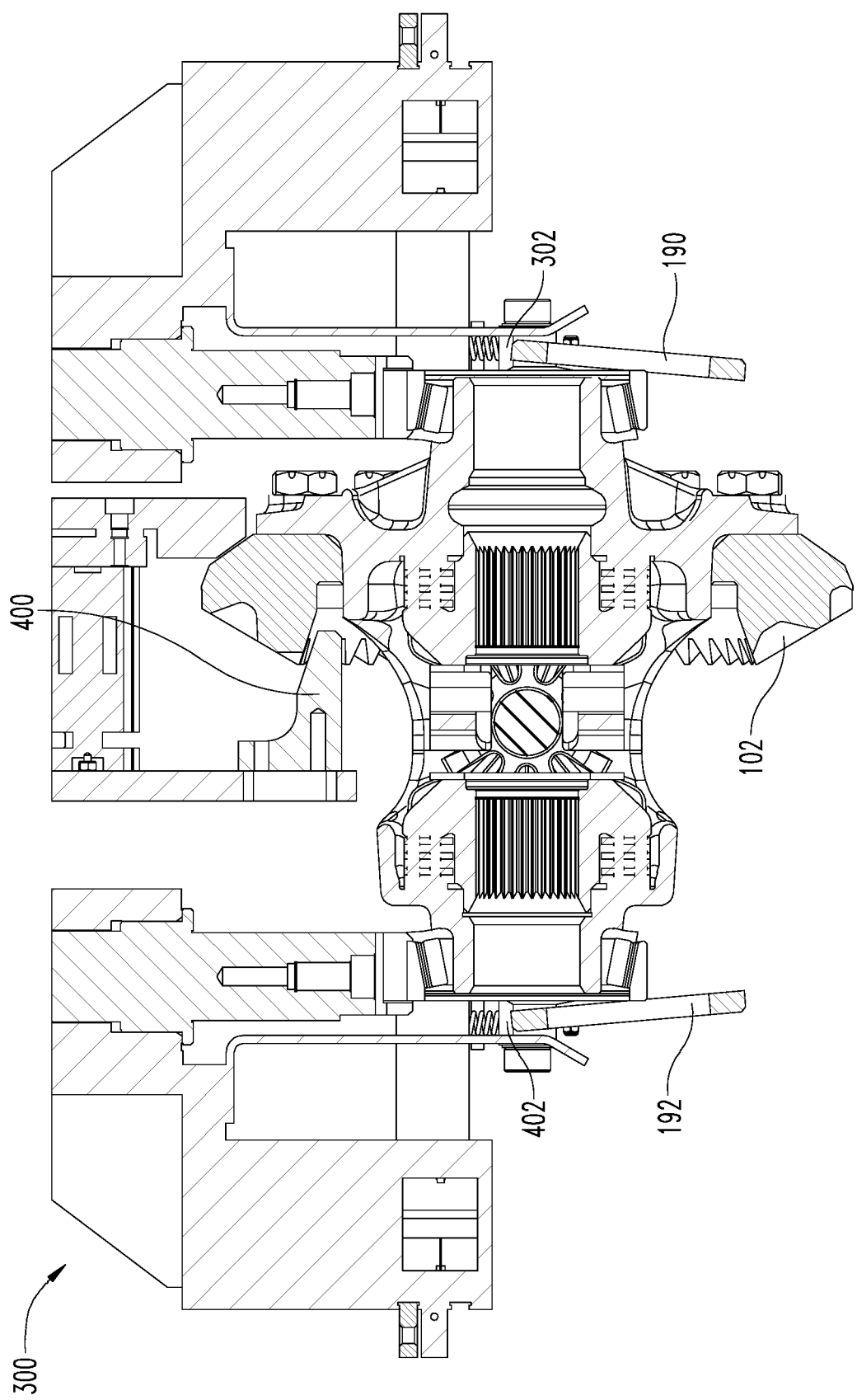
FIG. 4 illustrates an example differential case and shims being lifted by a robot.

Referring to FIG. 4, the differential case 102, the first shim 190, and the second shim 192 may be removed from the nesting structure 100 by the robot 300. In an example, the robot 300 comprises one or more second gripping structures 400 that may grip the differential case 102. The robot 300 may also comprise a third gripping structure 402 that may grip the second shim 192. In an example, the third gripping structure 402 is substantially similar in structure to the gripping structure 302 (e.g., illustrated in FIGS. 3 and 4).

The robot 300 may maintain the first shim 190 and the second shim 192 in the first orientation with respect to the differential case 102. For example, when the gripping structure 302 initially grips the first shim 190 when the first shim 190 is supported by the nesting structure 100, the gripping structure 302 may maintain the first shim 190 in the first orientation. Likewise, when the third gripping structure 402 initially grips the second shim 192 when the second shim 192 is supported by the nesting structure 100, the third gripping structure 402 may maintain the second shim 192 in the first orientation. In this way, the robot 300 may grip/lift the differential case 102, the first shim 190, and the second shim 192, thus causing the differential case 102, the first shim 190, and the second shim 192 to be removed from the nesting structure 100. As the robot 300 removes the differential case 102, the first shim 190, and the second shim 192 from the nesting structure 100, the relative positions of the first shim 190 and the second shim 192 with respect to the differential case 102 may be maintained in the first orientation.

Figure 5:
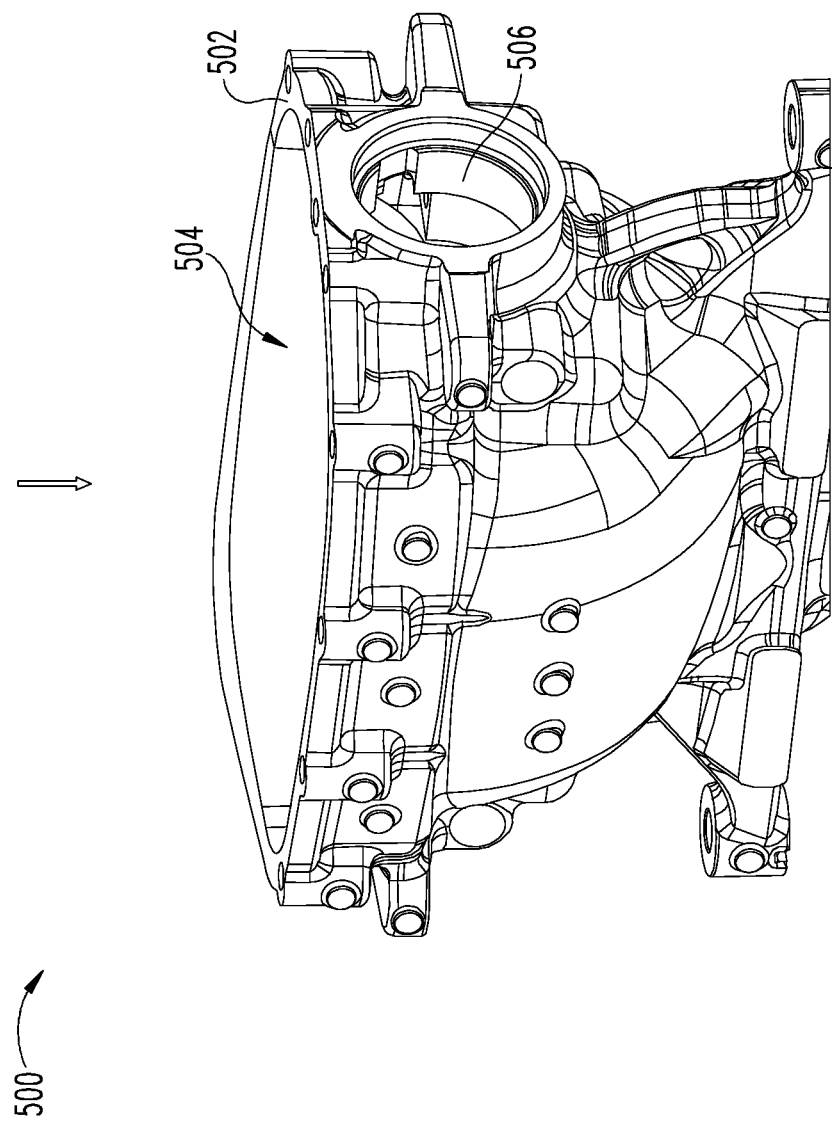
FIG. 5 illustrates an example portion of an example differential carrier.

Referring to FIG. 5, an example of a differential carrier 500 is illustrated. After the differential case 102, the first shim 190, and the second shim 192 are removed from the nesting structure 100, the robot 300 may insert the differential case 102, the first shim 190, and the second shim 192 into the differential carrier 500. It will be appreciated that the differential carrier 500 comprises any number of different sizes, shapes, configurations, and constructions. Indeed, the differential carrier 500 illustrated in FIG. 5 is merely an example of a possible differential carrier that the differential case 102, the first shim 190, and the second shim 192 may be inserted into.

The differential carrier 500 comprises a carrier wall 502. In an example, the carrier wall 502 defines a differential opening 504 into which the differential case 102, the first shim 190, and the second shim 192 may be inserted. In an example, the differential opening 504 may have a quadrilateral shape with rounded corners, though any number of shapes are envisioned. The carrier wall 502 may define one or more wall openings 506 that may be aligned with respect to the first bearing surface 172 and the second bearing surface 174.

Figure 6:
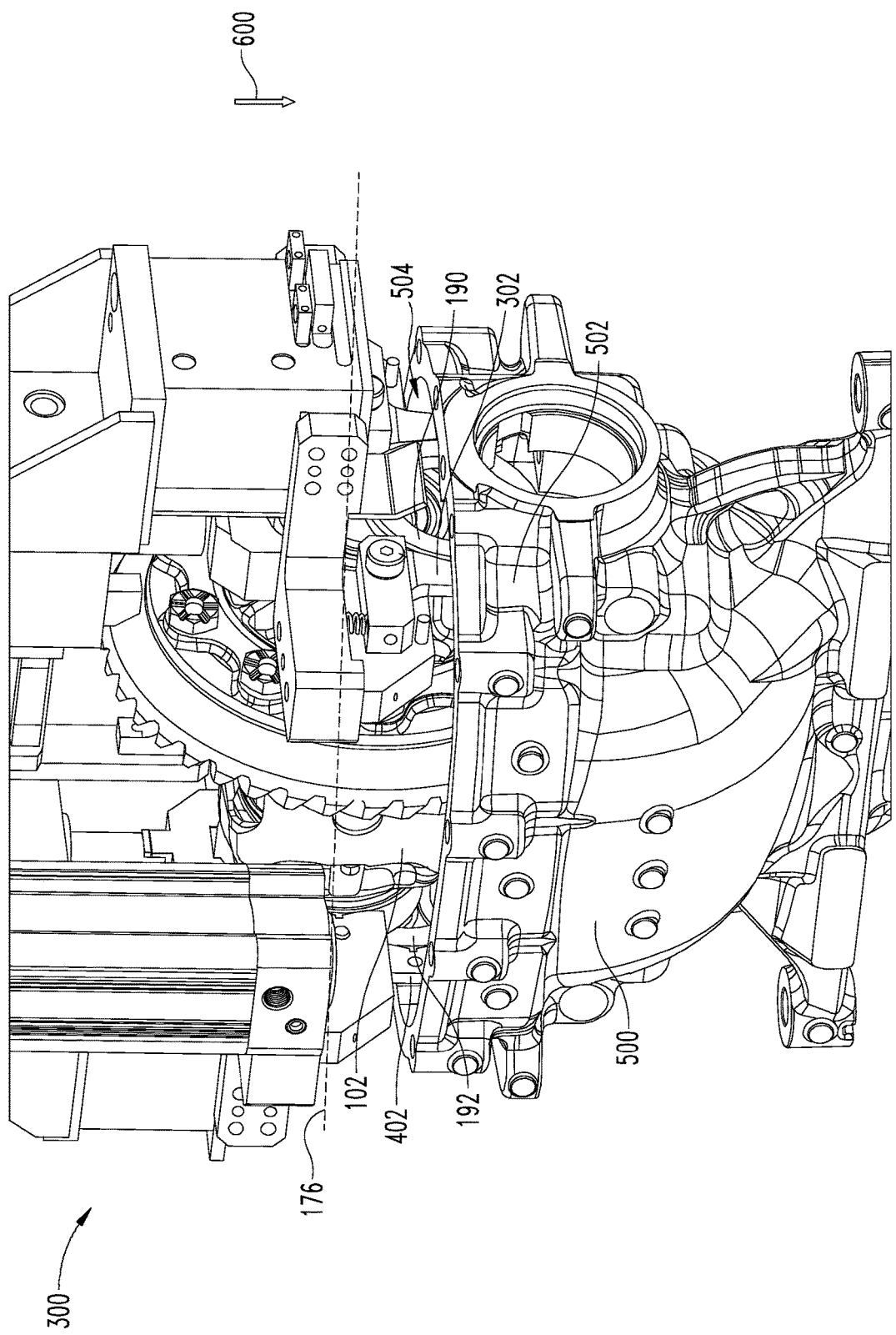
FIG. 6 illustrates an example differential case and shims being inserted into an example differential carrier.

Referring to FIG. 6, the robot 300 may concurrently insert the differential case 102, the first shim 190, and the second shim 192 into the differential carrier 500. For example, the robot 300 may move along a first direction 600 (e.g., downward) towards the differential carrier 500. As the robot 300 moves in the first direction 600, the differential case 102, the first shim 190, and the second shim 192 may be inserted into the differential opening 504 defined by the differential carrier 500. The gripping structure 302 may release the first shim 190 by moving the first gripping arm 304 and the second gripping arm 306 (e.g., illustrated in FIG. 3) in an outward direction. Likewise, the third gripping structure 402 may release the second shim 192 by moving gripping arms of the third gripping structure 402 in an outward direction. In this way, the first shim 190 and the second shim 192 may no longer be maintained in the first orientation. The robot 300 may similarly release the differential case 102 allowing for the differential case 102 to move downwardly into the differential carrier 500. In an example, when the robot 300 releases the differential case 102, the first shim 190, and the 192, the differential case 102, the first shim 190, and the 192 may fall into the differential opening 504 of the differential carrier 500 under the influence of gravity.

After the gripping structure 302 releases the first shim 190, the first shim 190 may contact the carrier wall 502 of the differential carrier 500 and may move from the first orientation to a second orientation. In the second orientation, the first shim 190 is parallel with respect to the first bearing surface 172. Similarly, after the third gripping structure 402 releases the second shim 192, the second shim 192 may contact the carrier wall 502 of the differential carrier 500 and may move from the first orientation to the second orientation. In the second orientation, the second shim 192 is parallel with respect to the second bearing surface 174. In an example, due to the first orientation of at least one of the first shim 190 or the second shim 192, a force may not be applied to the differential carrier 500 in a direction that is perpendicular to the differential case axis 176 to deform and/or elongate a size of the differential opening defined by the differential carrier when the first shim 190, the second shim 192, and the differential case 102 are concurrently inserted into the differential opening 504. That is, a force (e.g., a compressive force, tension force, etc.) may not be applied to one or more of the carrier walls 502 of the differential carrier 500 to alter a size of the differential opening (e.g., elongate the differential opening in a direction along the differential case axis 176 by narrowing the differential opening in a direction perpendicular to the differential case axis 176) when the first shim 190, the second shim 192, and the differential case 102 are concurrently inserted into the differential opening 504 of the differential carrier 500.

Figure 7:
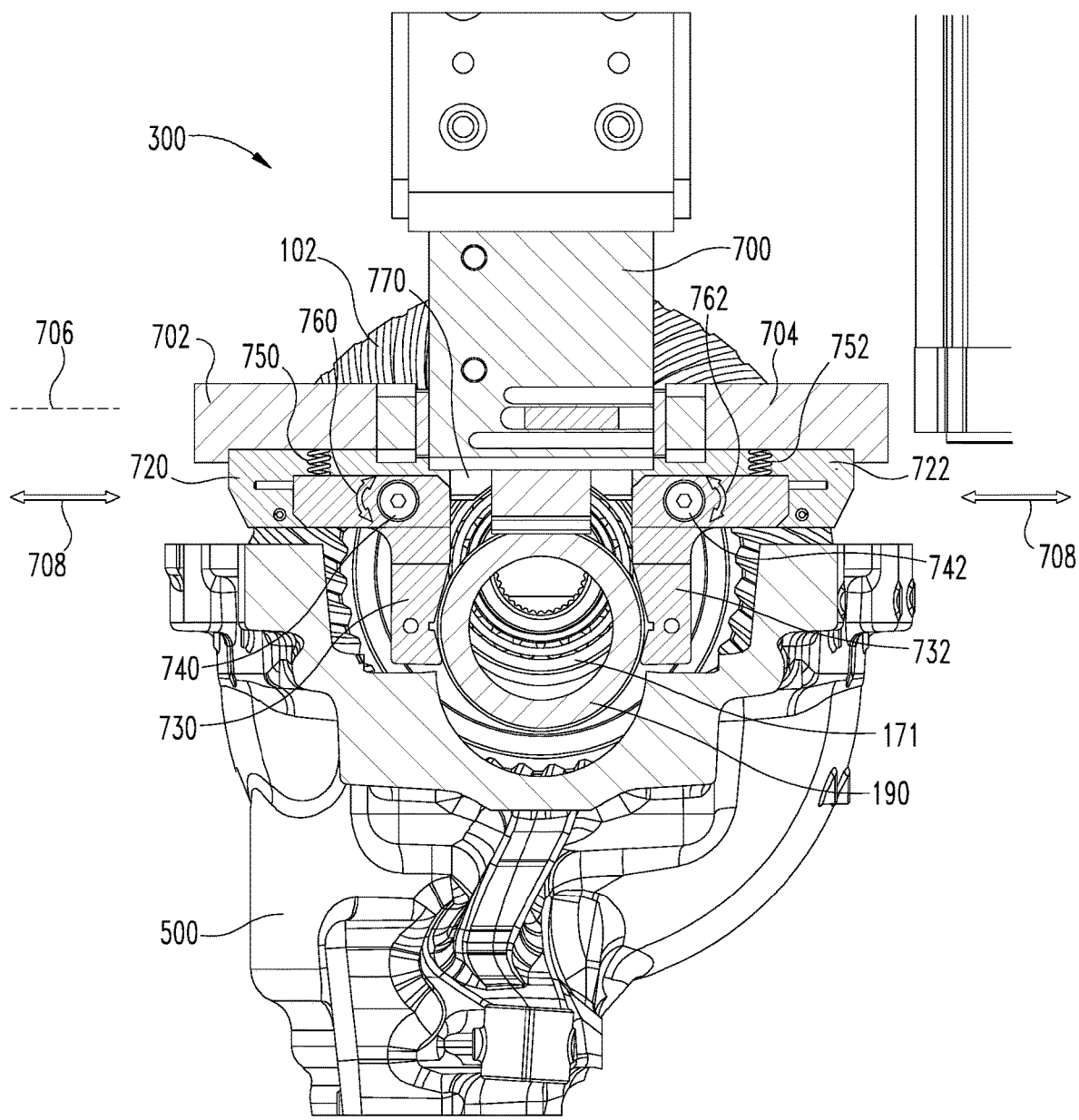
FIG. 7 illustrates an example robot inserting an example differential case and shims into an example differential carrier.

FIG. 7 illustrates an example of the robot 300 moving the differential case 102 from the nesting structure 100 to the differential carrier 500. The robot 300 comprises a support structure 700. The support structure 700 can be positioned vertically above the differential case 102 when the robot 300 picks up the differential case 102. As illustrated in FIGS. 6 and 7, the robot 300 can insert the first shim 190, the second shim 192, and the differential case 102 into the differential opening 504 defined by the differential carrier 500. In this way, the first shim 190, the second shim 192, and the differential case 102 may be in a first position that is not fully seated within the differential carrier 500. In the first position, a bottom surface(s) of the first shim 190, the second shim 192, and/or the differential case 102 may not, for example, contact the differential carrier 500. In the first position, the first shim 190 may be non-parallel with respect to the first bearing surface 172 of the differential case 102 (e.g., have the non-parallel orientation illustrated in FIG. 2). In the first position, the second shim 192 may be non-parallel with respect to the second bearing surface 174 of the differential case 102 (e.g., have the non-parallel orientation illustrated in FIG. 2).

The robot 300 comprises one or more translating arms. For example, the robot 300 can comprise a first translating arm 702 and a second translating arm 704. The first translating arm 702 and the second translating arm 704 can be attached to the support structure 700. In an example, the first translating arm 702 and the second translating arm 704 are movable with respect to the support structure 700 along a translating axis 706. In this way, the first translating arm 702 and the second translating arm 704 can move along a movement direction 708. In an example, the translating axis 706 may be substantially parallel to a surface upon which the differential carrier 500 rests (e.g., the ground, the floor, etc.).

The robot 300 comprises one or more inner gripping arms. For example, the robot 300 can comprise a first inner gripping arm 720 and a second inner gripping arm 722. In an example, the first inner gripping arm 720 and the second inner gripping arm 722 may be spaced apart to define a gap, a space, an opening, etc. therebetween. The first inner gripping arm 720 and the second inner gripping arm 722 can be attached to the support structure 700 via the first translating arm 702 and the second translating arm 704. For example, the first inner gripping arm 720 can be attached to the first translating arm 702, which is movably attached to the support structure 700. Likewise, the second inner gripping arm 722 can be attached to the second translating arm 704, which is movably attached to the support structure 700.

In this way, the first inner gripping arm 720 and the second inner gripping arm 722 can be movable relative to the support structure 700 between an opened position (e.g., illustrated in FIG. 11) and a closed position (e.g., illustrated in FIG. 7). In the opened position, the first inner gripping arm 720 and the second inner gripping arm 722 are configured to removably receive the first bearing structure 171 of the differential case 102. In the closed position, the first inner gripping arm 720 and the second inner gripping arm 722 are configured to contact and grip the first bearing structure 171 of the differential case 102.

The robot 300 comprises one or more outer gripping arms. For example, the robot 300 can comprise a first outer gripping arm 730 and a second outer gripping arm 732. In an example, the first outer gripping arm 730 and the second outer gripping arm 732 can be positioned further from a center of the differential case 102 than the first inner gripping arm 720 and the second inner gripping arm 722. In an example, the first outer gripping arm 730 and the second outer gripping arm 732 may be spaced apart to define a gap, a space, an opening, etc. therebetween. The first outer gripping arm 730 can be attached to the first inner gripping arm 720, while the second outer gripping arm 732 can be attached to the second inner gripping arm 722. In this way, when the first inner gripping arm 720 and the second inner gripping arm 722 move (e.g., along the translating axis 706), the first outer gripping arm 730 and the second outer gripping arm 732 can likewise move along the translating axis 706.

The first outer gripping arm 730 can be attached to the first inner gripping arm 720 with a first attachment structure 740. The second outer gripping arm 732 can be attached to the second inner gripping arm 722 with a second attachment structure 742. In an example, the first attachment structure 740 and the second attachment structure 742 can comprise screws, bolts, nuts, etc. In this way, the first attachment structure 740 and the second attachment structure 742 can permit pivotal movement of the first outer gripping arm 730 and the second outer gripping arm 732 relative to the first inner gripping arm 720 and the second inner gripping arm 722, respectively.

In an example, the robot 300 comprises one or more biasing devices. For example, the robot 300 may comprise a first biasing device 750 and a second biasing device 752. The first biasing device 750 can be attached to and/or in contact with the first translating arm 702 and the first outer gripping arm 730. The first biasing device 750 can apply a force to the first outer gripping arm 730 to bias the first outer gripping arm 730 to pivot away from the first translating arm 702. In an example, the second biasing device 752 can be attached to and/or in contact with the second translating arm 704 and the second outer gripping arm 732. The second biasing device 752 can apply a force to the second outer gripping arm 732 to bias the second outer gripping arm 732 to pivot away from the second translating arm 704. In an example, the first attachment structure 740 and the first biasing device 750 can allow for pivoting movement of the first outer gripping arm 730 along a first movement direction 760. Likewise, in an example, the second attachment structure 742 and the second biasing device 752 can allow for pivoting movement of the second outer gripping arm 732 along a second movement direction 762.

In an example, the first outer gripping arm 730 and the second outer gripping arm 732 can be movable relative to the first inner gripping arm 720 and the second inner gripping arm 722, respectively, between an opened position (e.g., illustrated in FIG. 11) and a closed position (e.g., illustrated in FIG. 7). In the opened position, the first outer gripping arm 730 and the second outer gripping arm 732 are configured to removably receive the first shim 190. In the closed position, the first outer gripping arm 730 and the second outer gripping arm 732 are configured to contact and grip the first shim 190.

In an example, the robot 300 comprises a force applicator 770. The force applicator 770 can apply a force to the differential case 102 during insertion of the differential case 102 into the differential carrier 500. In an example, the force applicator 770 can apply the force along a substantially vertical direction that is perpendicular to the translating axis 706.

In FIG. 7, the first bearing structure 171 can be supported by the first inner gripping arm 720 and the second inner gripping arm 722. For example, the first inner gripping arm 720 and the second inner gripping arm 722 can sandwich and hold the first bearing structure 171. Likewise, the first shim 190 can be supported by the first outer gripping arm 730 and the second outer gripping arm 732. For example, the first outer gripping arm 730 and the second outer gripping arm 732 can sandwich and hold the first shim 190. In this way, the robot 300 can lift and move the differential case 102 while maintaining a relative position of the first shim 190 relative to the first bearing structure 171 of the differential case 102.

Figure 8:
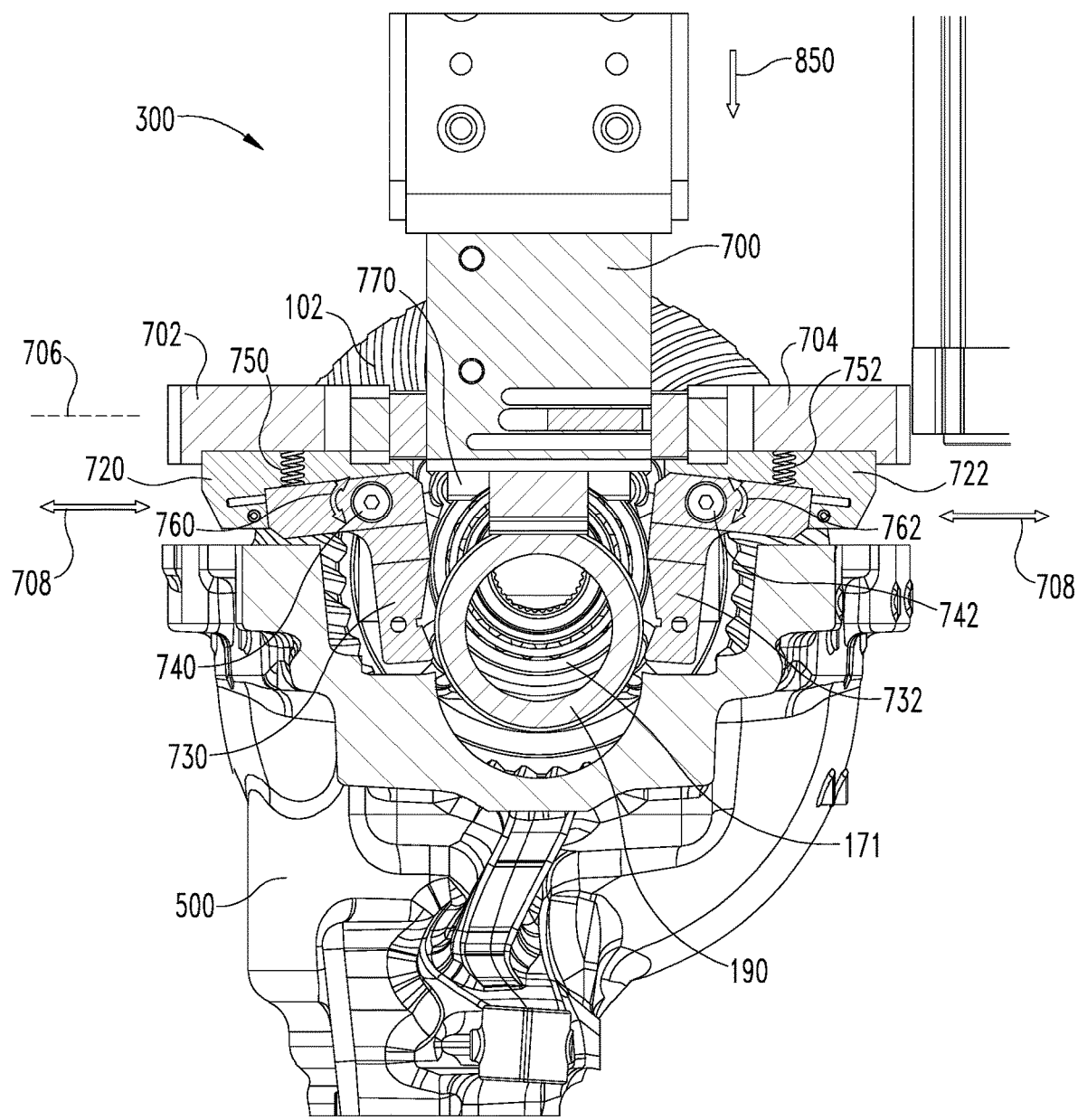
FIG. 8 illustrates an example robot inserting an example differential case and shims into an example differential carrier.

Referring to FIG. 8, the first translating arm 702 and the second translating arm 704 can be moved apart from the closed position (e.g., illustrated in FIG. 7 (to the opened position (e.g., illustrated in FIG. 8). For example, the first translating arm 702 and the second translating arm 704 can be moved away from each other along the movement direction 708. This movement can cause the first inner gripping arm 720 and the second inner gripping arm 722 to move from the closed position to the opened position, thus releasing the first bearing structure 171. Likewise, the first outer gripping arm 730 and the second outer gripping arm 732 can move and pivot from the closed position to the opened position, thus releasing the first shim 190.

In an example, due to the first outer gripping arm 730 and the second outer gripping arm 732 being spring loaded (e.g., by the first biasing device 750 and the second biasing device 752), the first outer gripping arm 730 and the second outer gripping arm 732 can remain in contact with the first shim 190 for a period after the first inner gripping arm 720 and the second inner gripping arm 722 have released the first bearing structure 171. Likewise, in an example, when the first inner gripping arm 720 and the second inner gripping arm 722 move from the opened position to the closed position, the first outer gripping arm 730 and the second outer gripping arm 732 can contact the first shim 190 before the first inner gripping arm 720 and the second inner gripping arm 722 contact the first bearing structure 171.

Figure 9:
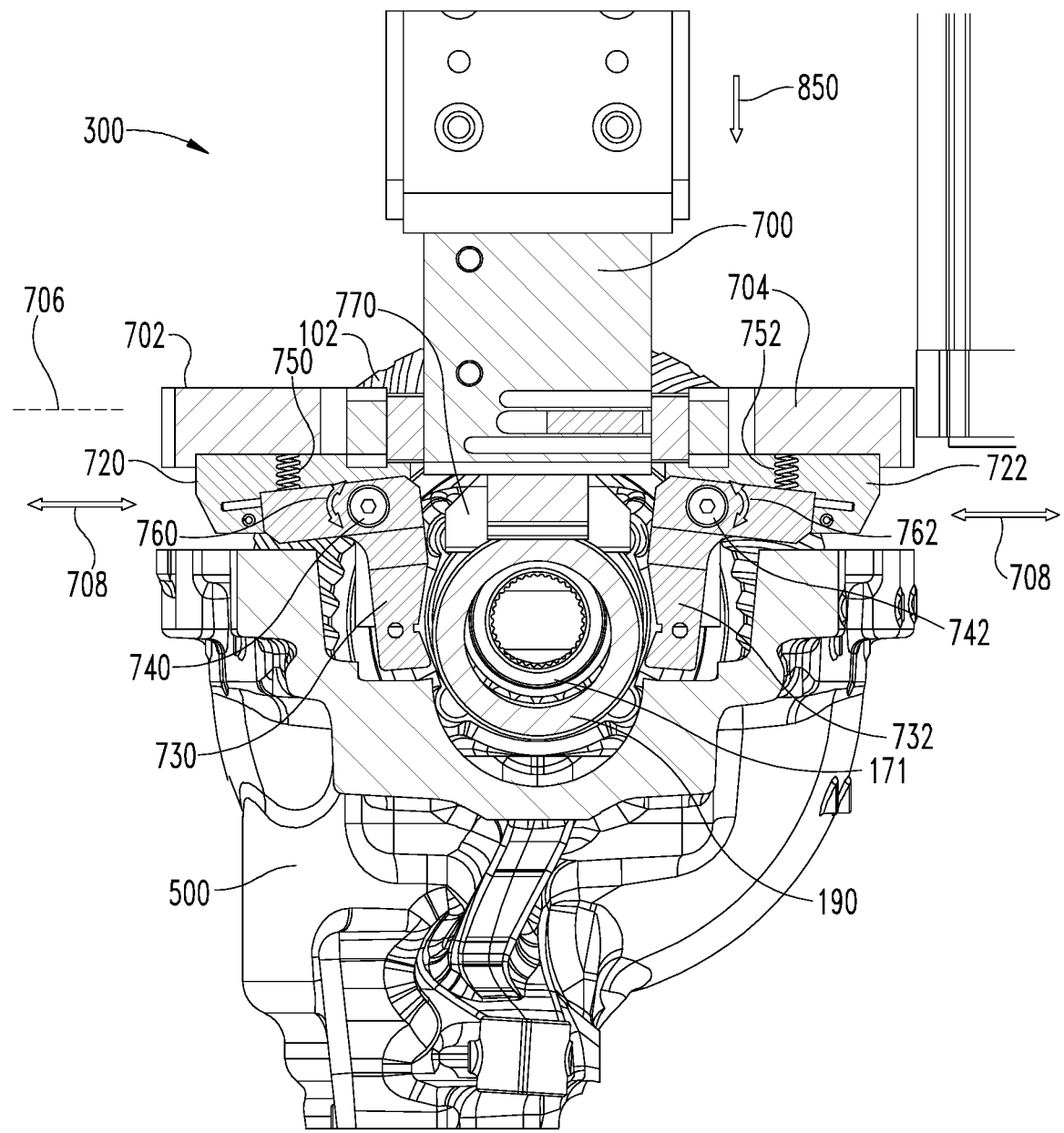
FIG. 9 illustrates an example robot inserting an example differential case and shims into an example differential carrier.

Referring to FIGS. 8 and 9, with the first bearing structure 171 and the first shim 190 released, the differential case 102 can fall into the differential carrier 500 (e.g., the first shim 190, the second shim 192 and/or the differential case 102 can be inserted into the differential opening 504 defined by the differential carrier 500 such that the first shim 190, the second shim 192, and/or the differential case 102 are in the first position not fully seated within the differential carrier 500). In an example, the force applicator 770 can apply a downward force (e.g., an insertion force 850) onto the differential case 102 to cause the differential case 102 to move into the differential carrier 500. As the differential case 102 moves further into the differential carrier 500, the first shim 190 can begin to align with (e.g., become less non-parallel with) the first bearing structure 171 and/or the second shim 192 can begin to align with (e.g., become less non-parallel with) the second bearing structure 173.

In an example, the force applicator 770 can apply the insertion force 850 to at least one of the first shim 190, the second shim 192, and/or the differential case 102. As a result of this insertion force 850, the first shim 190, the second shim 192, and the differential case 102 can transition from the first position (e.g., illustrated in FIGS. 6 and 7) to a second position (e.g., illustrated in FIG. 11) fully seated within the differential carrier 500. In the second position, a bottom surface(s) of the first shim 190, the second shim 192, and/or the differential case 102 may, for example, contact (e.g., interior surface(s) of) the differential carrier 500. As illustrated in FIG. 12, the first shim 190 may be parallel or at least substantially parallel with respect to the first bearing surface 172 of the differential case 102 in the fully seated position. The second shim 192 may be parallel or at least substantially parallel with respect to the second bearing surface 174 of the differential case 102.

Figure 10:
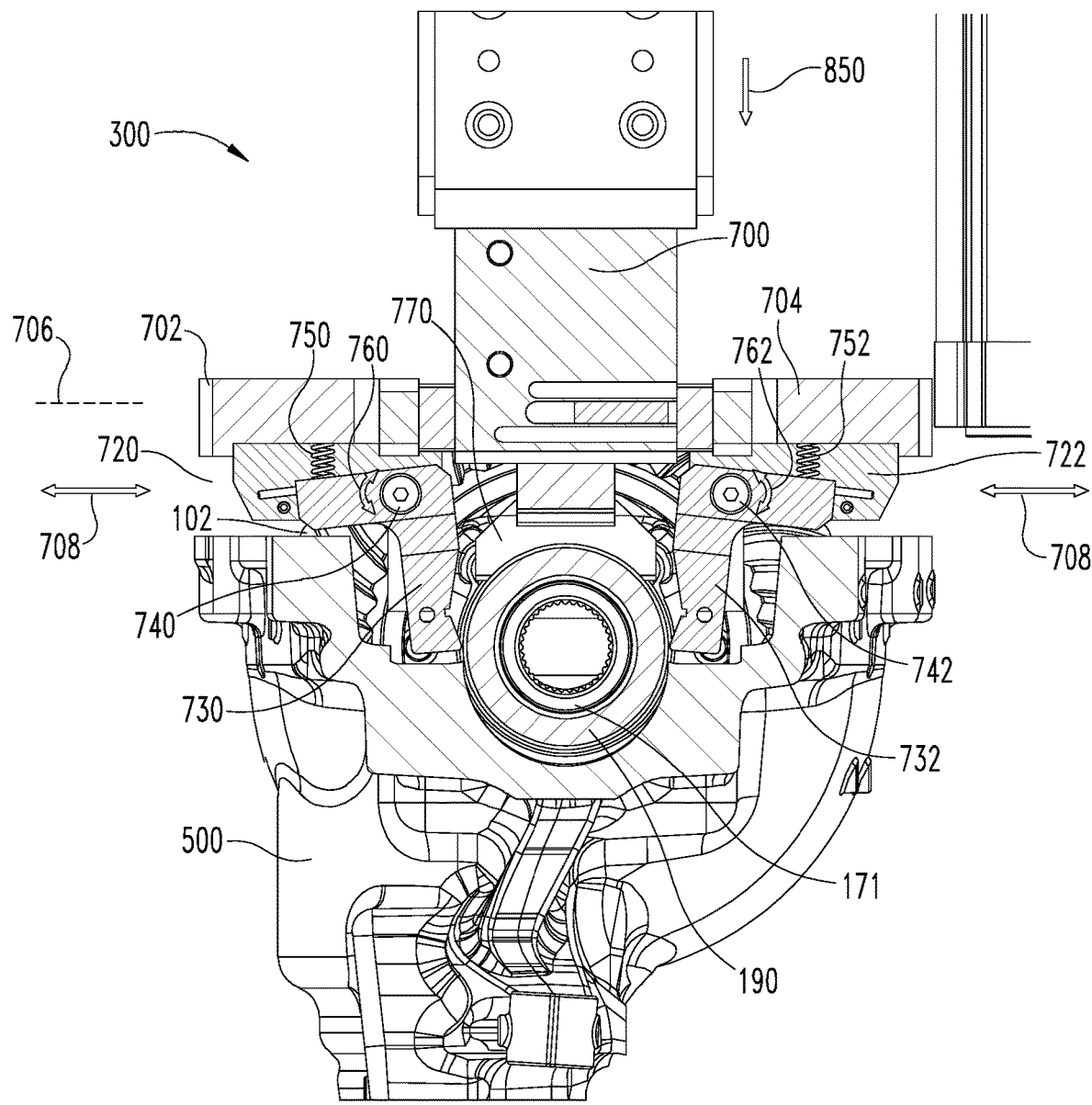
FIG. 10 illustrates an example robot inserting an example differential case and shims into an example differential carrier.
Figure 11:
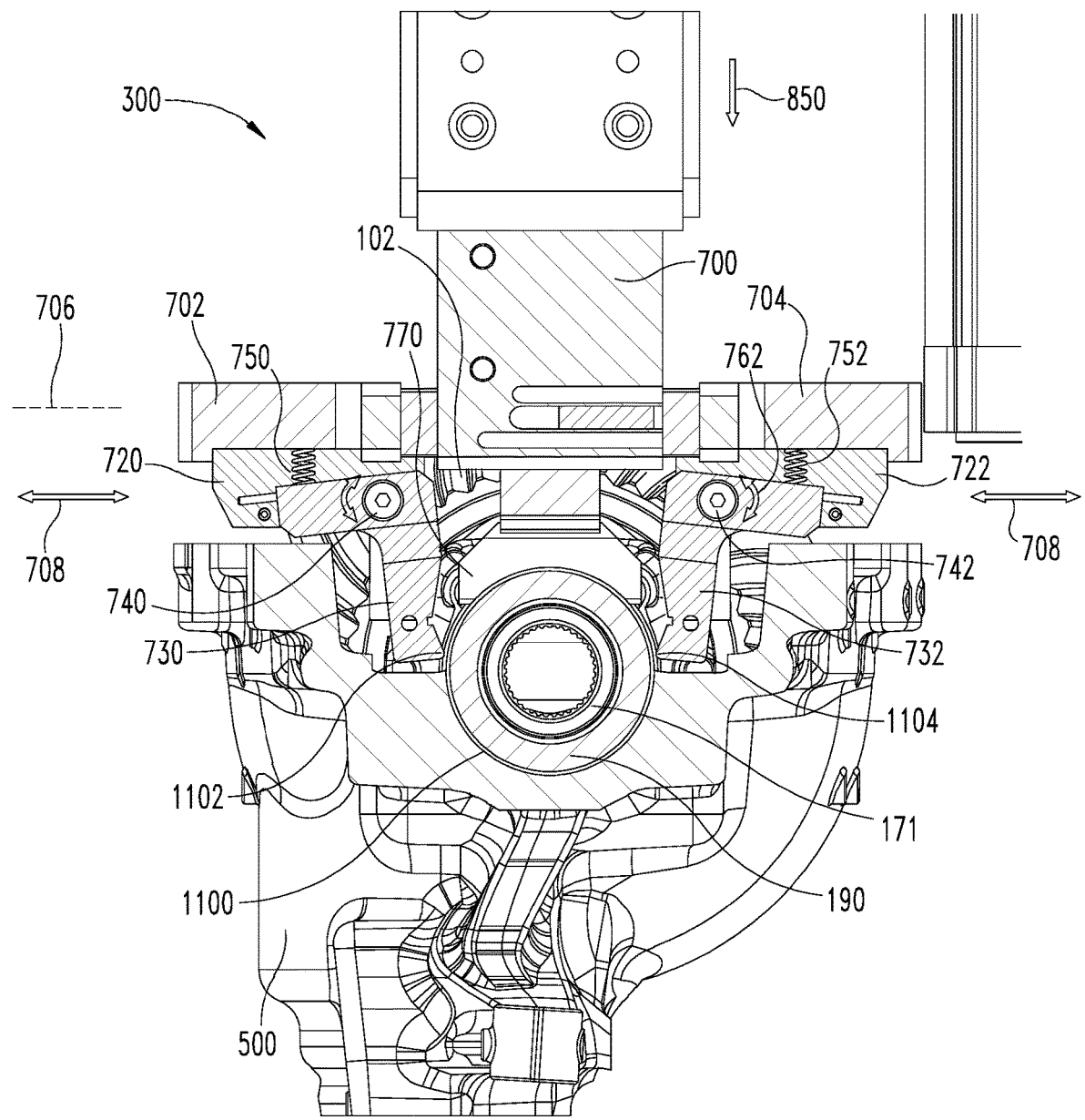
FIG. 11 illustrates an example robot inserting an example differential case and shims into an example differential carrier.
Figure 12:
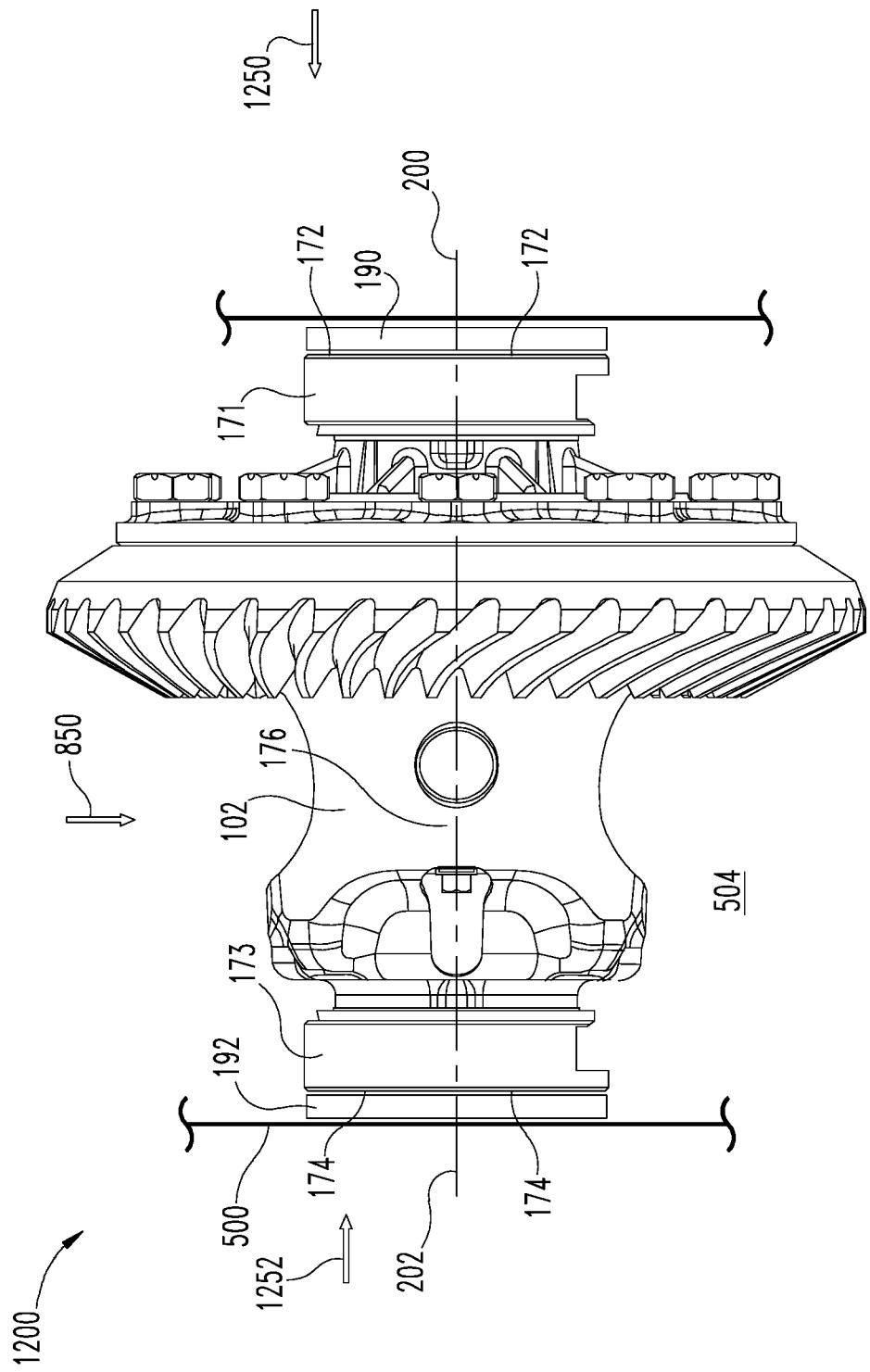
FIG. 12 illustrates an example differential case and shims supported within an example differential carrier.

Referring to FIGS. 10 and 11, with regard to effecting the transition from the first (unseated) position to the second (seated) position, the force applicator 770 can continue to apply a downward force (e.g., the insertion force 850) to the differential case 102. In addition to the insertion force 850, the effects of gravity can cause the first bearing structure 171 and the first shim 190 to be received within a seat 1100 defined within the differential carrier 500. In an example, a first end 1102 of the first outer gripping arm 730 and a second end 1104 of the second outer gripping arm 732 can maintain contact with the first shim 190 as the first shim 190 is released and moves towards the seat 1100.

It will be appreciated that while FIGS. 7 to 11 focus upon one side of the differential case 102 and the robot 300, the opposite side may be substantially similar or identical. For example, the side illustrated in FIGS. 7 to 11 comprises the first bearing structure 171, the first shim 190, the first translating arm 702, the second translating arm 704, the first inner gripping arm 720, the second inner gripping arm 722, the first outer gripping arm 730, the second outer gripping arm 732, etc. However, the other side of the robot 300 can comprise similar or identical structures for supporting the second bearing structure 173 and the second shim 192. Indeed, the robot 300 may comprise another pair of translating arm (e.g., that are similar or identical to the first translating arm 702 and the second translating arm 704), another pair of inner gripping arms (e.g., that are similar or identical to the first inner gripping arm 720 and the second inner gripping arm 722), another pair of outer gripping arms (e.g., that are similar or identical to the first outer gripping arm 730 and the second outer gripping arm 732), etc.

In addition, it will be appreciated that the robot 300 illustrated in FIGS. 7 to 11 comprises merely one example of a robot for supporting and moving the differential case 102 and the shims 190, 192. For example, the outer gripping arms 730, 732 are not limited to the illustrated attachment to the inner gripping arms 720, 722. Rather, in an example, the outer gripping arms 730, 732 may not pivot relative to the inner gripping arms 720, 722. Instead, in an example, the outer gripping arms 730, 732 can slide and/or translate relative to the inner gripping arms 720, 722. In such an example, the outer gripping arms 730, 732 may be movable along the translating axis 706 so as to be movable in a movable direction 708 relative to the outer gripping arms 730, 732.

FIG. 12 illustrates an example of a differential assembly 1200, in which the differential case 102, the first shim 190, and the second shim 192 are received within the differential opening 504 of the differential carrier 500. It will be appreciated that only a portion of the differential carrier 500 is illustrated in FIG. 12 for the purposes of illustration and to more clearly illustrate the respective positions of structures received within the differential opening 504 of the differential carrier 500. In an example, however, the differential opening 504 may be surrounded on a plurality of sides by the carrier wall 502 of the differential carrier 500.

In the example of FIG. 12, the first shim 190 and the second shim 192 are illustrated in the second orientation. When the first shim 190 is in the second orientation, the first shim axis 200 of the first shim 190 is parallel with respect to the differential case axis 176 of the differential case 102. In an example, when the second shim 192 is in the second orientation, the second shim axis 202 of the second shim 192 is parallel with respect to the differential case axis 176 of the differential case 102 and the first shim axis 200. In an example, in the second orientation, the first shim 190, the second shim 192, and the differential case 102 may extend co-axial with respect to one another such that the differential case axis 176, the first shim axis 200, and the second shim axis 202 are collinear. In the second orientation, the first shim 190 may extend substantially parallel to the second shim 192.

In this way, the first shim 190 and the second shim 192 can be aligned with respect to the differential case 102. In an example, after the robot releases the differential case 102, the first shim 190, and the second shim 192 into the differential carrier 500, the first shim 190 and the second shim 192 may be parallel to the first bearing surface 172 and the second bearing surface 174, but not co-axial with respect to the differential case axis 176 of the differential case 102. In such an example, after the first shim 190, the second shim 192, and the differential case 102 are inserted into the differential opening 504, the positions of the first shim 190 and the second shim 192 can be moved and adjusted. In an example, the first shim 190 and the second shim 192 can be moved (e.g., by a user, with a tool such as a hammer, etc.) such that the first shim axis 200 of the first shim 190 and the second shim axis 202 of the second shim 192 are collinear with respect to the differential case axis 176 of the differential case 102, as illustrated in FIG. 12.

In an example, the insertion force 850 applied by the force applicator 770 to at least one of the first shim 190, the second shim 192, and/or the differential case 102 can be measured (e.g., a pneumatic force associated with the force applicator 770 can be monitored, measured, etc.). By measuring the insertion force 850, an axial force (e.g., a bearing preload) that is applied by the differential carrier 500 in a direction parallel to the differential case axis 176 illustrated in FIG. 12 to the first shim 190, the first bearing surface 172, the second shim 192, and/or the second bearing surface 174 can be determined. In an example, the differential carrier 500 can apply a first axial force 1250 to the first shim 190 and the first bearing surface 172. The differential carrier 500 can apply a second axial force 1252 to the second shim 192 and the second bearing surface 174.

The insertion force 850 can be measured in any number of ways, such as with sensors (e.g., pressure sensors, etc.), force-sensing resistors, force gauges, etc. The insertion force 850 can be represented by variable f. In an example, a coefficient of friction of the first shim 190, the second shim 192, the differential case 102, and/or the differential carrier 500 may be known based on the material of the first shim 190, the second shim 192, the differential case 102, and/or the differential carrier 500. The coefficient of friction can be represented by variable μ. In this way, the axial force(s) 1250 and/or 1252 can be determined based on the insertion force 850 (e.g., f) and the coefficient of friction (e.g., μ), with the axial forces 1250, 1252 represented by variable N. For example, the axial forces 1250, 1252 may be represented by equation (1) as:

$$N \le \frac{f}{\mu} \quad (1)$$

In this way, the axial forces 1250, 1252 (e.g., N) that are applied to the first bearing surface 172 and the second bearing surface 174 by the differential carrier 500 can be determined from the insertion force (e.g., f). With the axial forces 1250, 1252 known, one or more features of the differential assembly 1200 can be adjusted. For example, if one or more of the axial forces do not fall within an acceptable, expected, etc. threshold range, a thickness and/or material composition of the first shim 190, a thickness and/or material composition of the second shim 192, a dimension and/or material composition of the differential case 102 (e.g., along the differential case axis 176), a dimension and/or material composition of the differential carrier 500, a dimension, size, etc. of the differential opening 504 defined by the differential carrier 500, etc. may be adjusted, such as in a feedforward and/or a feedback manner with regard to a differential assembly 1200 presently being assembled and/or one or more differential assemblies to be assembled (e.g., on an assembly line).

Figure 13:
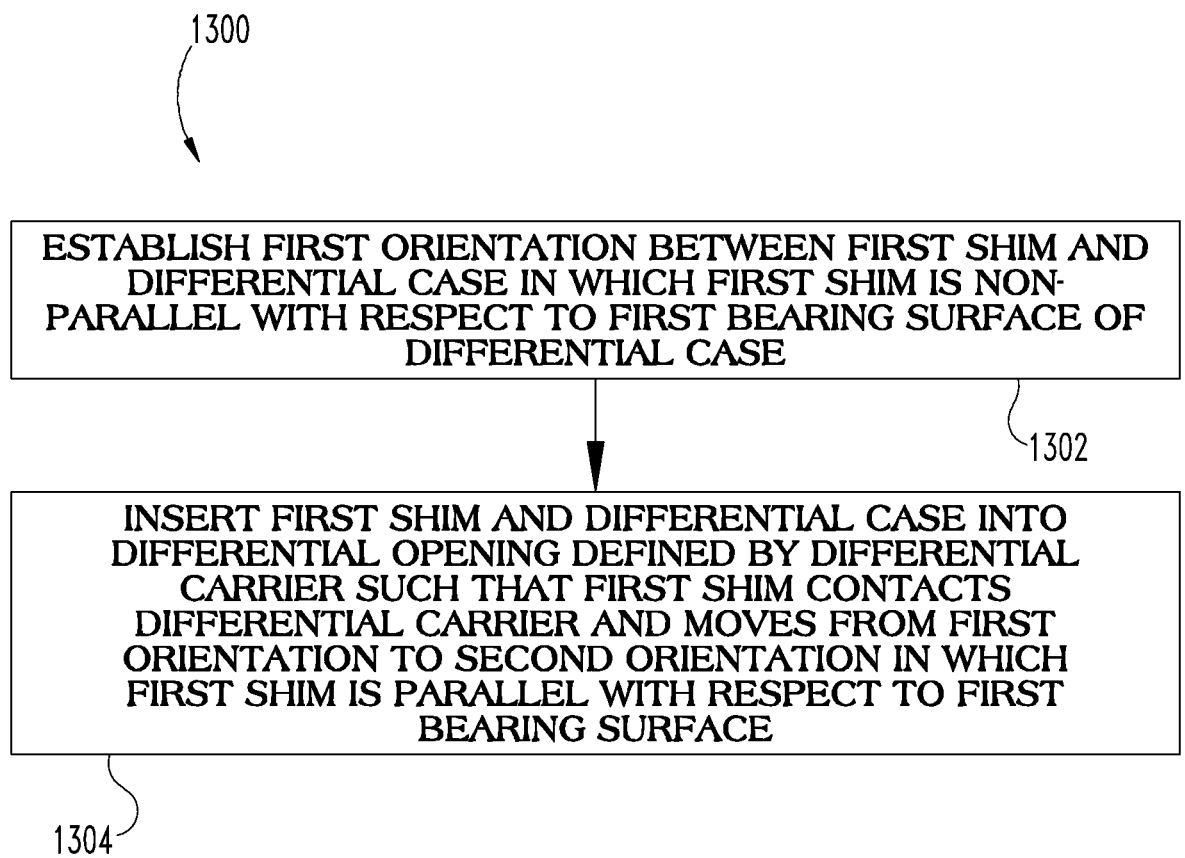
FIG. 13 illustrates an example method of assembling a differential assembly.

Referring to FIG. 13, an example method 1300 of assembling the differential assembly 1200 is provided. At 1302, the method 1300 comprises establishing the first orientation between the first shim 190 and the differential case 102 in which the first shim 190 is non-parallel with respect to the first bearing surface 172 of the differential case 102. At 1304, the method 1300 comprises inserting the first shim 190 and the differential case 102 into the differential opening 504 defined by the differential carrier 500 such that the first shim 190 contacts the differential carrier 500 and moves from the first orientation to the second orientation in which the first shim 190 is parallel with respect to the first bearing surface 172.

Figure 14:
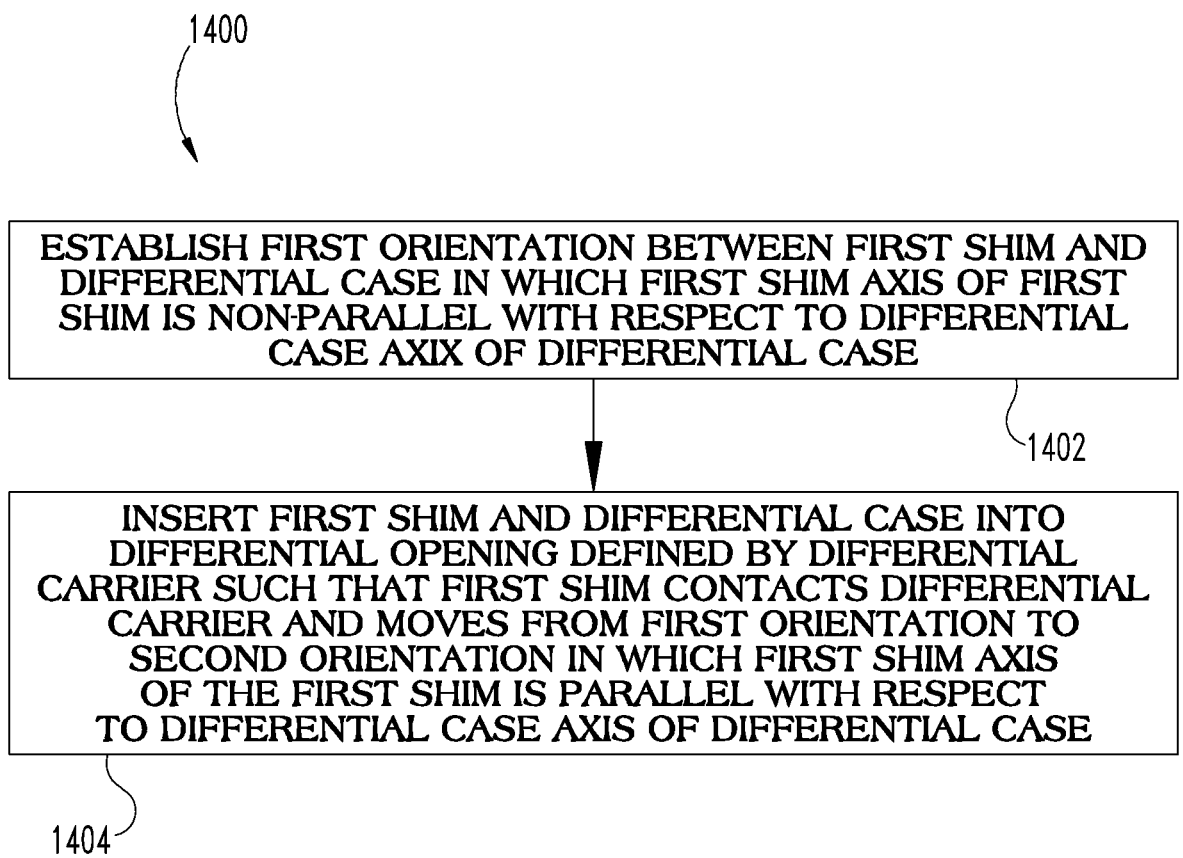
FIG. 14 illustrates an example method of assembling a differential assembly.

Referring to FIG. 14, an example method 1400 of assembling the differential assembly 1200 is provided. At 1402, the method 1400 comprises establishing the first orientation between the first shim 190 and the differential case 102 in which the first shim axis 200 of the first shim 190 is non-parallel with respect to the differential case axis 176 of the differential case 102. At 1404, the method 1400 comprises inserting the first shim 190 and the differential case 102 into the differential opening 504 defined by a differential carrier 500 such that the first shim 190 contacts the differential carrier 500 and moves from the first orientation to the second orientation in which the first shim axis 200 of the first shim 190 is parallel with respect to the differential case axis 176 of the differential case 102.

Referring to FIG. 15, an example method 1500 of assembling the differential assembly 1200 is provided. At 1502, the method 1500 comprises concurrently inserting the first shim 190, the second shim 192, and the differential case 102 into the differential opening 504 defined by the differential carrier 500. As such, upon the first shim 190, the second shim 192, and the differential case 102 being fully seated within the differential carrier 500, the first shim 190 contacts the differential carrier 500 and is parallel with respect to the first bearing surface 172 of the differential case 102, and the second shim 192 contacts the differential carrier 500 and is parallel with respect to the second bearing surface 174 of the differential case 102. As illustrated in FIGS. 11 and 12, when the first shim 190, the second shim 192, and the differential case 102 are fully seated, the differential case axis 176, the first shim axis 200, and the second shim axis 202 are coaxial with one another. In such a fully seated position, the first shim 190 may be substantially parallel to the first bearing surface 172 while the second shim 192 may be substantially parallel to the second bearing surface 174.

When concurrently inserting the inserting the first shim 190, the second shim 192, and the differential case 102 into the differential opening 504, but before the first shim 190, the second shim 192, and the differential case 102 being fully seated within the differential carrier 500, at least one of the first shim 190 or the second shim 192 may, but need not, be in the first orientation (e.g., the first shim axis 200 of the first shim 190 is non-parallel with respect to the differential case axis 176, the first shim 190 is non-parallel with respect to the first bearing surface 172, the second shim axis 202 of the second shim 192 is non-parallel with respect to the differential case axis 176, and/or the second shim 192 is non-parallel with respect to the second bearing surface 174, etc.).

Figure 16:
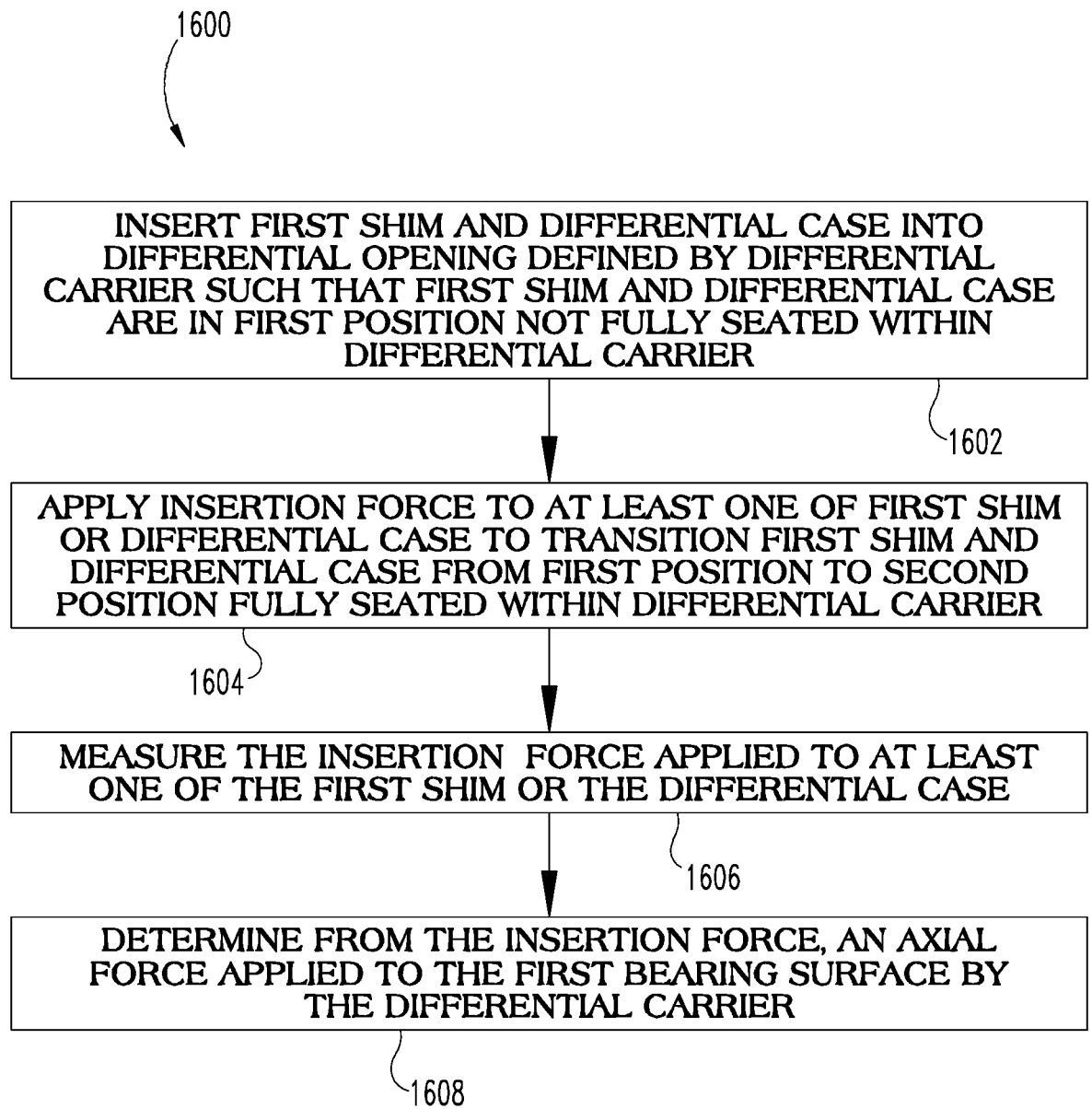
FIG. 16 illustrates an example method of assembling a differential assembly.

Referring to FIG. 16, an example method 1600 of assembling the differential assembly 1200 is provided. At 1602, the method 1600 comprises inserting the first shim 190 and the differential case 102 into the differential opening 504 defined by the differential carrier 500. As such, the first shim 190 and the differential case 102 may be in the first position that is not fully seated within the differential carrier 500. In an example, the second shim 192 is also (concurrently) inserted into the differential opening 504 in the first (unseated) position. At 1604, the method 1600 comprises applying the insertion force 850 to at least one of the first shim 190 or the differential case 102 to transition the first shim 190 and the differential case 102 from the first position to the second position that is fully seated within the differential carrier 500. In an example, the second shim 192 is also (concurrently) transitioned to the second (seated) position.

At 1606, the method 1600 comprises measuring the insertion force 850 applied to at least one of the first shim 190 or the differential case 102 (e.g., and/or the second shim 192). At 1608, the method 1600 comprises determining, from the insertion force 850, the axial force 1250 applied to the first bearing surface 172 by the differential carrier 500. In an example, the axial force 1252 applied to the second bearing surface 174 is also (concurrently) determined.

Figure 17:
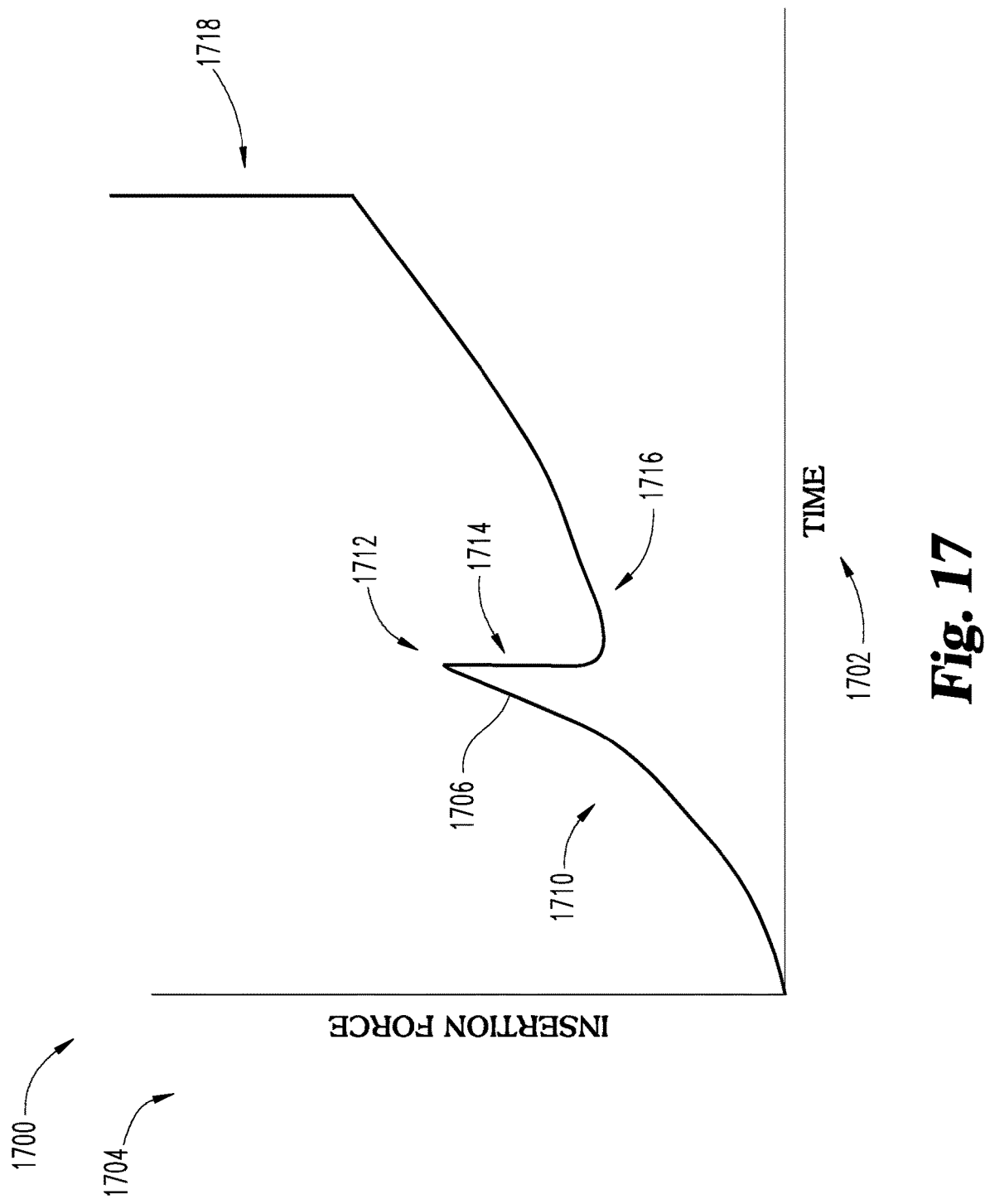
FIG. 17 illustrates a graphical representation of an insertion force vs. time relationship of when a differential case is inserted into a differential carrier.

Referring to FIG. 17, a graph 1700 depicting a relationship between the insertion force 850 (applied to at least one of the first shim 190, the second shim 192, and/or the differential case 102) and time is illustrated. The x-axis 1702 represents time while the y-axis 1704 represents the insertion force 850. A line 1706 represents the change in the insertion force 850 over time.

At 1710, the first shim 190 may be non-parallel with respect to the first bearing surface 172 while the second shim 192 may be non-parallel with respect to the second bearing surface 174. The insertion force 850 may increase until 1712 when the first shim 190 may transition from non-parallel to parallel with respect to the fir first bearing surface 172 and/or the second shim 192 may transition from non-parallel to parallel with respect to the second bearing surface 174 (e.g., the first shim 190, the second shim 192, and the differential case 102 may be in the first position so as to not be fully seated within the differential carrier 500). At 1714, the insertion force 850 may decrease as the first shim 190 and/or the second shim 192 have transitioned from being non-parallel with respect to the bearing surfaces 172, 174 to being parallel with respect to the bearing surface 172, 174 (e.g., but still not in the second (fully seated) position). With the first shim 190 and/or the second shim 192 being parallel, the insertion force 850 may again increase at 1716. At 1718, the insertion force 850 has caused the shims 190, 192 and the differential case 102 to transition from the first (not fully seated) position to the second (fully seated) position within the differential carrier 500.

The insertion force 850 may be measured at any number of points along the line 1706 to determine the axial force 1250, 1252 applied to the bearing surfaces 172, 174 of the differential case 102. In an example, the insertion force 850 may be measured at 1716, which represents the time between when the 190, 192 are parallel to the bearing surfaces 172, 174 but prior to the shims 190, 192 and the differential case 102 being fully seated (e.g., as illustrated in FIGS. 11 and 12) within the differential carrier 500.

It may be appreciated that the nesting structure 100 provides a number of benefits. For example, the nesting structure 100 can support the differential case 102 while allowing for the first shim 190 and the second shim 192 to be maintained in the first orientation prior to insertion into the differential carrier 500. With the first shim 190 and the second shim 192 in the first orientation, the robot 300 can lift and insert the differential case 102, the first shim 190, and the second shim 192 into the differential carrier 500. Such an orientation of the first shim 190 and the second shim 192 can reduce friction and wear on the first shim 190, the second shim 192, the first bearing surface 172, and the second bearing surface 174.

The aforementioned process may also reduce the need for squeezing and/or stretching of the differential carrier 500 to install the differential case 102 and the shims 190, 192. As such, a potential for distortion and elastic deformation of the differential carrier 500 caused from squeezing and/or stretching can be reduced.

As used in this application, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component generally correspond to component A and component B or two different or two identical components or the same component.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A nesting structure configured to support a differential case, the nesting structure comprising:
   a first support structure configured to support the differential case; and
   a second support structure spaced apart from the first support structure to define a support opening configured to receive a first shim and establish a first orientation between the first shim and the differential case in which the first shim is non-parallel with respect to a first bearing surface of the differential case.

2. The nesting structure of claim 1, wherein the first support structure is attached to the second support structure to define the support opening.

3. The nesting structure of claim 1, wherein the second support structure comprises a second support wall that supports the first shim, the first shim extending parallel to the second support wall when the shim is in the first orientation.

4. The nesting structure of claim 3, wherein the second support wall is non-parallel with respect to the first bearing surface of the differential case when the first support structure supports the differential case.

5. The nesting structure of claim 1, comprising a third support structure configured to support the differential case.

6. The nesting structure of claim 5, comprising a fourth support structure spaced apart from the third support structure to define a second support opening configured to receive a second shim and establish a first orientation between the second shim and the differential case in which the second shim is non-parallel with respect to a second bearing surface of the differential case.

7. The nesting structure of claim 6, wherein the first shim is non-parallel with respect to the second shim when the first orientation between the first shim and the differential case is established and the first orientation between the second shim and the differential case is established.

8. The nesting structure of claim 7, wherein a first shim axis of the first shim is non-parallel with respect to a differential case axis of the differential case when the first orientation between the first shim and the differential case is established.

9. The nesting structure of claim 8, wherein a second shim axis of the second shim is non-parallel with respect to the differential case axis of the differential case when the first orientation between the second shim and the differential case is established.

10. The nesting structure of claim 9, wherein the first shim axis is non-parallel with respect to the second shim axis when the first orientation between the first shim and the differential case is established and the first orientation between the second shim and the differential case is established.

11. A nesting structure configured to support a differential case, the nesting structure comprising:
a first support and a second support spaced apart from the first support to define a case opening between the first and second supports that is configured to receive the differential case with opposite ends of the differential case supported by respective ones of the first and second supports, wherein each of the first and second supports includes first and second support structures spaced from one another to define a support opening therebetween for receiving the respective end of the differential case therein; and
a first shim and a second shim positioned in respective ones of the support openings of the first and second supports, the first and second shims in contact with the respective end of the differential case positioned within the support opening, wherein the first and second shims are non-parallel with one another.

12. The nesting structure of claim 11, further comprising a base extending between and attached to the first and second supports.

13. The nesting structure of claim 11, wherein the first and second shims are circular and match a size and shape of a bearing surface at the respective end of the differential case.

14. The nesting structure of claim 11, wherein the first support structure includes a first support wall and the second support structure includes a second support wall, and the support opening is located between the first and second support walls.

15. The nesting structure of claim 14, wherein the first support wall extends along a first support structure axis and the second support wall extends along a second support structure axis.

16. The nesting structure of claim 15, wherein the first support wall includes a first surface facing toward the case opening and a second surface opposite the first surface along the support opening, and the first surface is non-parallel to the first support structure axis and the second surface is parallel to the first support structure axis.

17. The nesting structure of claim 16, wherein the second support wall includes a third surface facing toward the case opening and extending along the support opening, and the third surface is non-parallel to the second support structure axis and non-parallel to the first support structure axis.

18. The nesting structure of claim 17, wherein the second support wall includes a first wall portion attached to the second surface of the first support wall and a second wall portion attached to the first wall portion, wherein the third surface extends along the second wall portion.

19. The nesting structure of claim 18, wherein the first wall portion includes a fourth surface extending along the support opening between the second wall surface and the third wall surface, and the fourth surface is non-perpendicular to the second wall surface and perpendicular to the third wall surface.

20. The nesting structure of claim 17, wherein the first and second shims are supported on and parallel to the third surface of the respective one of the first and second supports.

21. The nesting structure of claim 20, wherein a first shim axis of the first shim and a second shim axis of the second shim are non-parallel with respect to a differential case axis of the differential case.

22. A nesting structure configured to support a differential case, the nesting structure comprising:
a first support and a second support spaced apart from the first support to define a case opening between the first and second supports that is configured to receive the differential case with opposite ends of the differential case supported by respective ones of the first and second supports, wherein each of the first and second supports includes a support opening for receiving the respective end of the differential case therein, and wherein each of the first and second supports includes a first surface facing the case opening, a second surface along the support opening that faces away from the case opening, and a third surface along the support opening that faces toward the case opening, and the third surface is non-parallel to the second surface and non-parallel to a bearing surface at the respective end of the differential case positioned in the support opening; and
a first shim and a second shim positioned in respective ones of the support openings of the first and second supports, each of the first and second shims located between and in contact with the third surface of the respective opening and the bearing surface at the respective end of the differential case positioned within the support opening.

23. The nesting structure of claim 22, wherein the first and second shims are non-parallel with one another.

24. The nesting structure of claim 22, wherein a first shim axis of the first shim and a second shim axis of the second shim are non-parallel with respect to a differential case axis of the differential case.

25. The nesting structure of claim 22, further comprising a base extending between and attached to the first and second supports.

26. The nesting structure of claim 22, wherein the first and second shims are circular and match a size and shape of the bearing surface at the respective end of the differential case.

* * * * *